(12) United States Patent
Tagami et al.

(10) Patent No.: US 8,770,218 B2
(45) Date of Patent: Jul. 8, 2014

(54) FILL-UP CONTROL VALVE DEVICE

(75) Inventors: Hiroya Tagami, Oyama (JP); Keiji Suzuki, Oyama (JP)

(73) Assignee: Kyosan Denki Co., Ltd., Koga (JP)

( * ) Notice: Subject to any disclaimer, the term of this patent is extended or adjusted under 35 U.S.C. 154(b) by 240 days.

(21) Appl. No.: 13/013,060

(22) Filed: Jan. 25, 2011

(65) Prior Publication Data

US 2011/0186149 A1 Aug. 4, 2011

(30) Foreign Application Priority Data

Feb. 2, 2010 (JP) .................................. 2010-021592
Aug. 20, 2010 (JP) .................................. 2010-185465

(51) Int. Cl.
*F16K 24/04* (2006.01)

(52) U.S. Cl.
USPC ............................................ 137/202; 137/43

(58) Field of Classification Search
USPC .............. 137/38, 39, 43, 202, 409, 429, 587; 141/59, 198, 202, 229; 220/86.2
See application file for complete search history.

(56) References Cited

U.S. PATENT DOCUMENTS

| | | | | |
|---|---|---|---|---|
| 5,065,782 A * | 11/1991 | Szlaga | ............................... | 137/39 |
| 5,632,296 A * | 5/1997 | Kasugai et al. | ................. | 137/43 |
| 5,678,590 A * | 10/1997 | Kasugai et al. | ............... | 137/202 |
| 5,873,382 A * | 2/1999 | Hattori et al. | ................. | 137/202 |
| 5,901,733 A * | 5/1999 | Ohno et al. | ................... | 137/202 |
| 5,960,816 A * | 10/1999 | Mills et al. | .................... | 137/202 |
| 6,450,192 B1 * | 9/2002 | Romanek | ....................... | 137/202 |
| 6,532,983 B2 * | 3/2003 | Ganachaud | ..................... | 137/43 |
| 6,848,463 B2 * | 2/2005 | Johansen | ....................... | 137/202 |
| 6,941,966 B2 * | 9/2005 | Mori et al. | ..................... | 137/202 |
| 6,994,103 B2 | 2/2006 | Takahashi et al. | | |
| 7,900,648 B2 * | 3/2011 | Rouxel et al. | ................. | 137/202 |
| 8,166,995 B2 * | 5/2012 | Arnalsteen et al. | ............. | 137/43 |
| 2004/0003844 A1 * | 1/2004 | Yamada et al. | ................ | 137/202 |
| 2004/0134532 A1 * | 7/2004 | Yamada et al. | ................ | 137/202 |

\* cited by examiner

*Primary Examiner* — Craig Schneider
*Assistant Examiner* — Craig J Price
(74) *Attorney, Agent, or Firm* — Posz Law Group, PLC

(57) ABSTRACT

A casing has a vessel portion, in which a float valve unit is arranged. A fuel drain through-hole having a small diameter is formed at a closed end bottom of the vessel portion. A cross sectional area of the fuel drain through-hole is extremely smaller than an opening area of an inlet port, so that fuel discharging speed of the liquid fuel from the vessel portion through the fuel drain through-hole is suppressed to a small value. As a result, a fuel holding time of the liquid fuel in the vessel portion, which has entered into the vessel portion from the inlet port, is made longer.

10 Claims, 12 Drawing Sheets

FILL-UP CONTROL VALVE DEVICE

CROSS REFERENCE TO RELATED APPLICATION

This application is based on Japanese Patent Applications No. 2010-021592 filed on Feb. 2, 2010 and No. 2010-185465 filed on Aug. 20, 2010, the disclosures of which are incorporated herein by reference.

FIELD OF THE INVENTION

The present invention relates to a fill-up control valve device provided in a ventilation passage communicating an inside space of a fuel tank with an outside space.

BACKGROUND OF THE INVENTION

A fill-up control valve device is known in the art, for example, as disclosed in Japanese Patent Publication No. 2004-257264 (corresponding to U.S. Pat. No. 6,994,103 B2). The fill-up control valve device has a float valve unit which is arranged in a casing attached to a fuel tank, wherein the floating valve unit floats on liquid fuel. When a fuel liquid level in the fuel tank is raised and reaches at a first predetermined level (which corresponds to a fuel filled-up level), the liquid fuel enters the casing through a ventilation hole (a first ventilation hole) formed at a lower end of the casing. Then, the fuel liquid level in the casing is raised up to a second predetermined level, which is higher than the first predetermined level, so that the float valve unit is floated up and seated on a valve seat formed at an upper portion of the casing. As a result, a ventilation passage for communicating an inside of the fuel tank with an outside thereof is closed.

As above, when the liquid fuel is fed into the fuel tank from a fuel feeding port and the fuel liquid level in the fuel tank is raised to the fuel filled-up level, inner pressure of the fuel tank is increased so that a fuel liquid level in a fuel feed pipe is raised up to a portion close to the fuel feeding port. Then, a fuel feeding operation of a fuel feeding gun is automatically stopped by an automatic fuel stop mechanism of the fuel feeding gun. Therefore, additional fuel feed, which would raise the fuel liquid level higher than the fuel filled-up level, is prevented.

In the above filled-up control valve device, another (second) ventilation hole having a small diameter is formed at the casing at such a portion higher than the above second predetermined level, for the purpose of reducing pressure fluctuation in the fuel tank after the liquid fuel is filled up in the fuel tank. According to such a structure, an inside space of the fuel tank and an inside space of the casing is communicated with each other through the second ventilation hole.

According to the above filled-up control valve device, when the fuel liquid level in the fuel tank reaches at a lower end of the casing (that is, almost the fuel filled-up level), the pressure in the inside of the casing becomes relatively lower than the pressure in the inside of the fuel tank, and thereby the fuel liquid level in the casing is raised by the increased pressure in the inside of the fuel tank and the float valve unit finally closes the ventilation passage. However, since the second ventilation hole is formed at the casing at such a position higher than the second predetermined level which is raised in the casing, the pressure in the casing and the pressure in the fuel tank are gradually counterbalanced. Then, the liquid fuel in the casing is discharged through the first ventilation hole formed at the lower end of the casing, so that the ventilation passage is opened by the float valve unit in a relatively short period since it has been closed. As a result, the inner pressure of the fuel tank is decreased. Then, the fuel liquid level in the fuel feed pipe may be lowered from the fuel feeding port. It is, therefore, a problem that additional fuel feed may become possible even in the case that the fuel tank is filled up with the fuel. It is desirable that the time period for keeping the valve closed condition of the float valve unit may be elongated in order to surely prevent the additional fuel feed after the filled-up condition in the fuel tank.

SUMMARY OF THE INVENTION

The present invention is, therefore, made in view of the foregoing problem, and has an object to provide a fill-up control valve device, according to which a valve closing period for a float valve unit can be elongated.

According to a feature of the invention, a fill-up control valve device has:

a casing attached to a fuel tank and having a ventilation passage for communicating an inside and an outside of the fuel tank with each other; and a float valve unit movably accommodated in a float accommodating space formed in the casing, so that the float valve unit is movable in a vertical direction in accordance with fuel liquid level in the casing to thereby operatively open and/or close the ventilation passage.

In the above fill-up control valve device;

when the fuel liquid level in the fuel tank is raised to reach at a first predetermined level, the fuel liquid level in the casing is raised to a second predetermined level which is higher than the first predetermined level, so that the float valve unit is moved up to close the ventilation passage, the casing has a ventilating aperture formed at a position higher than the second predetermined level in order to communicate the inside of the fuel tank and the float accommodating space with each other, and the casing has a vessel portion with a closed end bottom, in which the float valve unit is arranged.

The vessel portion has;

an inlet port formed at a portion higher than the closed end bottom and for introducing a part of the liquid fuel into an inside of the vessel portion when the fuel liquid level reaches at a third predetermined level higher than the second predetermined level; and a fuel drain through-hole formed at the vessel portion at a portion lower than the inlet port and for discharging the liquid fuel introduced into the inside of the vessel portion from the inlet port, wherein a cross sectional area of the fuel drain through-hole is smaller than an opening area of the inlet port.

According to the above feature, when the fuel liquid level in the fuel tank is raised up to the first predetermined level, the fuel liquid level in the casing (more exactly, the fuel liquid level in the casing at an outside of the vessel portion) is raised up to the third predetermined level (corresponding to a height of an upper end of the vessel portion), which is higher than the first predetermined level. Then, the liquid fuel enters into the inside of the vessel portion from the inlet port, so that the float valve unit arranged in the vessel portion is floated up. When the fuel liquid level of the liquid fuel for pushing up the float valve unit is raised up to the second predetermined level (which is slightly lower than the third predetermined level), the float valve unit is moved up to a valve closing position (to thereby close the ventilation passage). The casing has the ventilation hole for communicating the inside space of the fuel tank with the float accommodating space, wherein the ventilation hole is formed at a position higher than the third predetermined level, so that the pressure in the casing and the pressure in the fuel tank are gradually counterbalanced. Since the inlet port of the vessel portion is located at the position higher than the closed end bottom, the liquid fuel is stored in the portion of the vessel portion lower than the inlet port. And the liquid fuel is discharged through the fuel drain through-hole, which is formed at the position lower than the inlet port. Since the cross sectional area of the fuel drain through-hole is smaller than the opening area of the inlet port, a discharging speed of the liquid fuel to be discharged from the vessel portion through the fuel drain through-hole is suppressed to a small value. Accordingly, the liquid fuel having entered into the vessel portion can be held therein for a relatively longer period. As above, the time period for keeping the valve closed condition of the float valve unit can be made longer.

According to another feature of the invention, the fuel tank is mounted in a vehicle, and the casing has:

a fuel pooling portion being capable of pooling the liquid fuel in an inside thereof;

a fuel inlet aperture for communicating the inside of the fuel pooling portion with the inside of the vessel portion so that the liquid fuel may flow from the vessel portion into the fuel pooling portion;

a fuel discharge aperture for discharging the liquid fuel pooled in the fuel pooling portion; and a valve member for closing the fuel discharge aperture when the vehicle is in its stopped condition and for opening the fuel discharge aperture when the vehicle starts its running operation, wherein the float valve unit opens the ventilation passage when a predetermined amount of the liquid fuel in the vessel portion flows into the fuel pooling portion.

For example, when the liquid fuel is fed into the fuel tank from a fuel feed pipe by a fuel feeding gun having an automatic stopping mechanism, a larger amount of the liquid fuel is fed in a first fuel feeding process than a fuel feeding case of a subsequent second fuel feeding process. Therefore, the liquid fuel is more easily bubbled to generate a large amount of fuel vapor in the first fuel feeding process than the second fuel feeding process. Accordingly, when the fill-up control valve device keeps the valve closed condition at a first automatic stop (in the first fuel feeding process), the inner pressure in the fuel tank may be increased due to the large amount of the fuel vapor, and thereby the fuel may be spilled over from a fuel feeding port. According to the features of the embodiment, however, it is possible to prevent the fuel from spilling over from the fuel feeding port.

According to the above feature of the invention, in the case that the fuel is fed into the fuel tank in a condition that the vehicle is stopped, the liquid fuel is discharged from the inside of the fuel pooling portion as a result of a valve opening movement of the valve member when the vehicle starts its running operation. Thus, substantially no liquid fuel remains in the fuel pooling portion. Under this condition, when the fuel is fed into the fuel tank in the first fuel feeding process until a first operation of the automatic stop mechanism, the liquid fuel enters into the vessel portion from the inlet port, the float valve unit arranged in the vessel portion is floated up to the valve closing position to close the ventilation passage. Apart of the liquid fuel, which has entered into the vessel portion, flows into the fuel pooling portion. As a result, the fuel liquid level in the vessel portion is lowered by such amount of the liquid fuel having flown into the fuel pooling portion. Accordingly, the float valve unit immediately opens the ventilation passage to thereby suppress increase of the pressure in the fuel tank. Therefore, it is possible to prevent the fuel from spilling over from the fuel feeding port at the first automatic stop.

A timing for moving down the float valve unit in order to open the ventilation passage may be set at such a timing, at which not the liquid fuel amount corresponding to the inner volume of the fuel pooling portion but a part of such liquid fuel amount (a smaller amount than such liquid fuel amount) has flown into the fuel pooling portion from the vessel portion.

When the vehicle is in the stopped condition and the fuel is being fed, the valve member keeps the valve closed condition for the fuel discharge aperture. Therefore, the liquid fuel having entered into the fuel pooling portion during the first fuel feeding process is not discharged. As a result, the liquid fuel flowing into the vessel portion during the second fuel feeding process can be held in the vessel portion for a longer period than that of the first fuel feeding process, so that the valve closed condition for the ventilation passage by the float valve unit can be maintained for the longer period.

According to a further feature of the invention, the fuel discharge aperture is formed at a lower surface portion of the fuel pooling portion, and an upper surface of the lower surface portion is formed in a tapered surface, so that a surface portion away from the fuel discharge aperture becomes higher as a distance of the surface portion from the fuel discharge aperture becomes longer. Furthermore, the valve member is made of such material, a specific gravity of which is larger than that of the liquid fuel, and the valve member is formed in a ball shape so that the valve member is movable in the fuel pooling portion.

According to such feature, therefore, when the vehicle is in the stopped condition, the fuel discharge aperture is surely closed by the ball-shaped valve member. When the vehicle starts its traveling movement, the fuel discharge aperture is easily opened by the ball-shaped valve member, which is moved by the inertia relative to the fuel pooling portion. As above, the fuel discharge aperture can be surely and easily closed and/or opened by a simple structure of the valve unit. In other words, it is possible to easily structure the valve unit, according to which the fuel discharge aperture is closed at the vehicle stopping condition while the fuel discharge aperture is opened at the vehicle starting condition.

According to a still further feature of the invention, the fuel pooling portion is integrally formed with the vessel portion at a lower side thereof. According to such feature, it is possible to easily make the structure, according to which the liquid fuel in the vessel portion flows into the fuel pooling portion.

According to a still further feature of the invention, a cross sectional area of the fuel drain through-hole is gradually reduced from an inner side toward an outer side of the vessel portion. According to the above feature, the cross sectional area of the fuel drain through-hole is minimum at its downstream end and is gradually enlarged toward its upstream end. As a result, the flow characteristic of the liquid fuel, which enters the fuel drain through-hole at the upstream end (at which the cross sectional area. is maximum), flows through the fuel drain through-hole and flows out from the downstream end thereof, can be easily stabilized. In addition, it is possible to stabilize the time duration for keeping the valve closed condition by the float valve unit.

The structure of the flied drain through-hole, the cross sectional area of which is gradually reduced from the upper side toward the lower side, can be easily realized by making an inner peripheral surface of the fuel drain through-hole as a tapered surface.

According to a still further feature of the invention, a fuel guiding portion is formed at the fuel drain through-hole so that the liquid fuel flows along the fuel guiding portion. According to such feature, it is possible to easily stabilize the flow characteristic of the liquid fuel flowing through the fuel drain through-hole, by making the liquid fuel to flow along the fuel guiding portion. In addition, it is possible to stabilize the time duration for keeping the valve closed condition by the float valve unit.

The fuel guiding portion can be easily formed, when the fuel guiding portion is composed of an annular projecting portion downwardly projecting from an outer periphery of a lower end of the fuel drain through-hole, and a lower end surface of the annular projecting portion is inclined with respect to an axial line of the fuel drain through-hole.

According to a still further feature of the invention, for example, the vessel portion has a side wall portion, which functions as a float guiding portion, so that the float alve unit is guided by the float guiding portion when it is moved in a vertical direction. Since it is not necessary to provide the float guiding portion separately from the vessel portion, a structure of the casing can be simplified.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
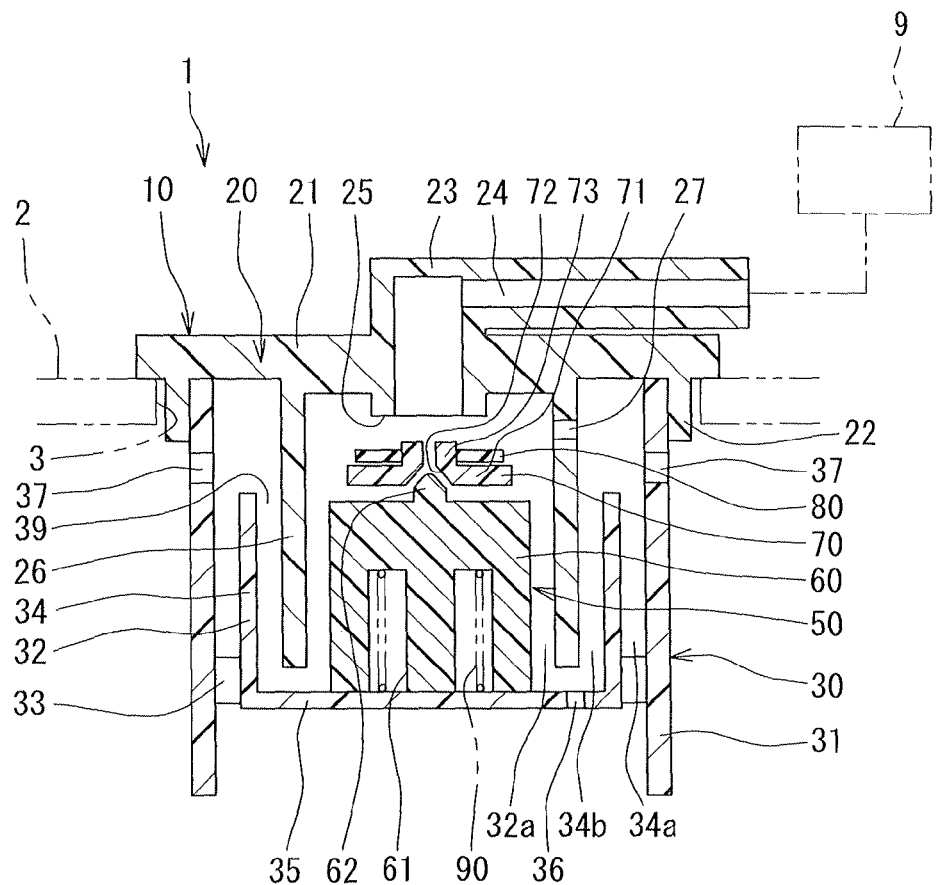
FIG. 1 is a schematic cross sectional view showing an outlined structure of a fill-up control valve device 1 according to a first embodiment, to which the present invention is applied.

Embodiments of the present invention will be explained hereinafter with reference to the drawings. The same reference numerals are used throughout the embodiments so as to designate the same or similar parts or components. Unless otherwise described, an invention explained in one of the embodiments may be combined to an invention explained in the other embodiments.

(First Embodiment)

Figure 2:
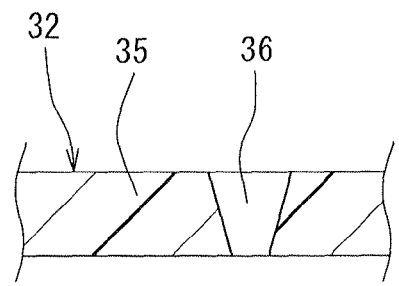
FIG. 2 is a schematic cross sectional view showing a relevant portion of a vessel portion 32 of the fill-up control valve device 1 according to the first embodiment.

FIG. 1 is a schematic cross-sectional view showing an outlined structure of a fill-up control valve device 1 according to a first embodiment, to which the present invention is applied. And FIG. 2 is a schematic cross sectional view showing a relevant portion of a vessel portion 32 of the fill-up control valve device 1.

As shown in FIG. 1, the fill-up control valve device 1 is attached to an opening 3 formed at an upper side wall of a fuel tank 2, which is for example mounted to a vehicle. The fill-up control valve device 1 is a valve device for opening and/or closing a ventilation passage 24, which connects an inside space of the fuel tank with a canister 9 located at an outside of the fuel tank 2, so that the fuel tank 2 is operatively communicated to the canister 9 depending on a liquid surface level (a liquid surface position) of liquid fuel in the fuel tank 2.

As shown in FIG. 1, the fill-up control valve device 1 is composed of a casing 10 and a float valve unit 50 accommodated in the casing 10. The casing 10 is composed of an upper casing part and a lower casing part 30, both of which are made of resin, for example. The upper casing part 20 has a flat plate portion 21, an annular fixing portion 22, a pipe portion 23 and a float guiding portion 26, wherein those portions are integrally formed with each other.

The flat plate portion 21 is formed in a disc shape, an outer diameter of which is a little bit larger an inner diameter of the opening 3 of the fuel tank 2. The annular fixing portion 22 projects downwardly from an outer periphery of the flat plate portion 21 and formed in an annular shape. An outer diameter of the annular fixing portion 22 is smaller than the inner diameter of the opening 3 of the fuel tank 2, while an inner diameter of the annular fixing portion 22 is almost equal to an outer diameter of an outer cylindrical portion 31 of the lower casing part 30, as explained below.

The pipe portion 23 is formed in an L-letter shape, which projects upwardly from a center of the flat plate portion 21. The ventilation passage 24 is formed in an inside of the pipe portion 23, so that the inside of the casing 10 and the canister 9 are communicated with each other. On a side of the pipe portion 23 to the fuel tank 2, the ventilation passage 24 passes through the flat plate portion 21 such that a lower end portion (an end portion on the side to the fuel tank) downwardly and slightly projects from a lower surface of the flat plate portion 21.

The float guiding portion 26 is formed at the lower surface of the flat plate portion 21 and located at such a position which is at an inner side of the annular fixing portion 22 but at an outer side of the pipe portion 23. The float guiding portion 26 is formed in a cylindrical shape, which is downwardly projected. The flat plate portion 21, the annular fixing portion 22, the lower projecting portion of the pipe portion 23 (the portion of the pipe portion 23 on the side of the fuel tank) and the float guiding portion 26 are coaxial with each other.

The lower casing part 30 is composed of the outer cylindrical portion 31, the vessel portion 32 and beam portions 33, wherein those portions are integrally formed with each other. The vessel portion 32 is formed in a cylindrical shape and has a cylindrical side wall portion 34 and a closed end bottom 35 formed at a lower end of the side wall portion 34. An outer diameter of the vessel portion 32 is smaller than an inner diameter of the outer cylindrical portion 31, so that the vessel portion 32 is arranged in a space inside of the outer cylindrical portion 31. An annular gap 34a is formed between the vessel portion 32 and the outer cylindrical portion 31. The side wall portion 34 of the vessel portion 32 and the outer cylindrical portion 31 are connected to each other by the multiple beam portions 33. The side wall portion 34 of the vessel portion 32 and the outer cylindrical portion 31 are coaxially arranged.

An outer diameter of the float guiding portion 26 of the upper casing part 20 is smaller than an inner diameter of the side wall portion 34 of the vessel portion 32 of the lower casing part 30, so that an annular clearance portion 34b is formed between the float guiding portion 26 and the side wall portion 34 of the vessel portion 32. An upper end of the outer cylindrical portion 31 of the lower casing part 30 is fitted into an inside of the annular fixing portion 22 of the upper casing part 20, so that a float accommodating space 32a is formed between the upper casing part 20 and the lower casing part 30, more exactly at an inside of the vessel portion 32 and furthermore at an inside of the float guiding portion 26. The lower casing part 30 may be easily attached to the upper casing part 20, for example, a snap-fit structure.

As shown in FIG. 1, the closed end bottom 35 of the vessel portion 32 is located at a position higher than that of a lower end of the outer cylindrical portion 31. Furthermore, an upper end of the side wall portion 34 of the vessel portion 32 is remote from the lower surface of the flat plate portion 21 of the upper casing part 20, while a lower end of the float guiding portion 26 is remote from the closed end bottom 35 of the vessel portion 32. The float guiding portion 26 is arranged in the inside of the vessel portion 32, so that the lower end of the float guiding portion 26 is located at a position lower than the upper end of the side wall 34 portion 34 of the vessel portion 32.

The float valve unit 50 is composed of a float 60, a seal plate 70, a valve member 80 and a coil spring 90. The float 60 is made of resin and formed in a light-weight cylindrical shape, wherein a ring shaped recessed portion 61 is formed at a lower side thereof so that the recessed portion 61 extends from the lower side in an upward direction. The ring shaped recessed portion 61 is formed in order to function as an air pooling space when it is in the liquid fuel. The coil spring 90 is provided in the ring shaped recessed portion 61. An upper end of the coil spring 90 is in contact with an upper end surface (that is, a ceiling surface) of the recessed portion 61, while a lower end of the coil spring 90 is in contact with the closed end bottom 35 of the vessel portion 32, so that the coil spring 90 always biases the float 60 in the upward direction. A projecting portion 62 (projecting in the upward direction) is formed at a center of an upper side surface of the float 60.

The seal plate 70 made of, for example, resin material is arranged above the float 60. The seal plate 70 is composed of a disc shaped plate portion 71 having a small aperture 72 at a center thereof, and a cylindrical portion 73 upwardly extending from the plate portion 71 at an outer periphery of the small aperture 72, wherein the plate portion 71 and the cylindrical portion 73 are integrally formed with each other. The valve member 80 is attached to the seal plate 70 at an outer periphery of the cylindrical portion 73. The valve member 80 is made of, for example, rubber and formed in a sheet shape extending on an upper surface of the plate portion 71.

The valve member 80 is brought into contact with a valve seat 25 formed at a lower side surface of the pipe portion 23 of the upper casing part 20, when the float valve unit 50 is upwardly moved to its uppermost position. Then, the communication of the ventilation passage 24 of the pipe portion 23 is shut off from the float accommodating space 32a for the float valve unit 50. The valve member 80 is a large-diameter seal member for mainly opening and/or closing the ventilation passage 24 (which communicates the inside of the fuel tank 2 with the canister 9) at a side of the fuel tank 2. The projecting portion 62 of the float 60 is a small-diameter seal member for secondarily opening and/or closing the ventilation passage 24 (more exactly, the small aperture 72) in the valve member 80. A passage area of the ventilation passage 24 (that is, the small aperture 72), which is opened and/or closed by the projecting portion 62, is smaller than that of the ventilation passage 24, which is opened and/or closed by the valve member 80.

Multiple first ventilating apertures 27, each having a small diameter, are formed in the float guiding portion 26 of the upper casing part 20 at such positions higher than the upper end of the side wall portion 34 of the vessel portion 32. Each of the first ventilating apertures 27 passes through the float guiding portion 26 in its radial direction.

Multiple second ventilating apertures 37, each having a small diameter, are likewise formed in the outer cylindrical portion 31 of the lower casing part 30 at such positions higher than the upper end of the side wall portion 34 of the vessel portion 32. Each of the second ventilating apertures 37 passes through the outer cylindrical portion 31 in its radial direction.

A fuel drain through-hole 36, having a small diameter, is formed at the closed end bottom 35 of the vessel portion 32, so that the through-hole 36 passes through the closed end bottom 35 in the vertical direction. As shown in FIG. 2, the through-hole 36 has a tapered inner peripheral surface in such a manner that a cross sectional area is gradually decreased from an upper end toward a lower end thereof (in other words, from the inside of the vessel portion 32 toward the outside thereof).

A minimum cross sectional area of the through-hole 36 (that is the cross sectional area of the through-hole 36 at its lower end) is made to be a value, which is extremely smaller than an area of an upper opening portion of the vessel portion 32 at an outside of the float guiding portion 26.

The upper opening portion (the annular clearance portion 34b) of the vessel portion 32 at the outside of the float guiding portion 26 corresponds to an inlet port 39 of the embodiment, while the fuel drain through-hole 36 corresponds to an outlet port of the embodiment.

Now, an operation of the above fill-up control valve device 1 according to the embodiment will be explained with reference to FIGS. 3A to 3D.

Figure 3A:
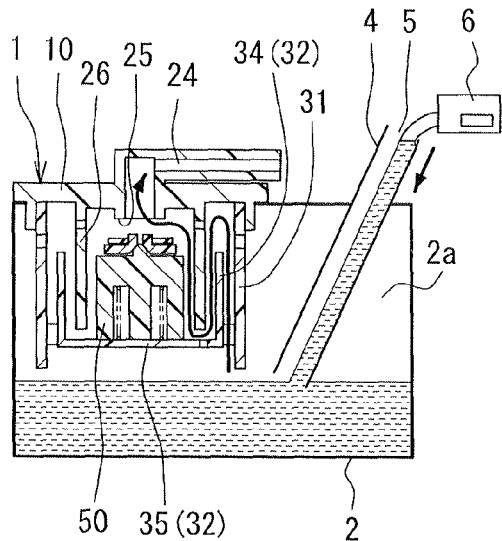
FIGS. 3A to 3D are schematic cross sectional views for explaining operation of the fill-up control valve device 1 when fuel is fed into a fuel tank 2.

As shown in FIG. 3A, the float valve unit 50 is in a valve opened condition, when a fuel liquid level is lower than a fuel filled-up level in the fuel tank 2, to which the fill-up control valve device 1 is attached. When the liquid fuel is fed into the fuel tank 2 from a fuel feeding gun 6 through a fuel feeding port of a fuel feed pipe (a fuel inlet pipe) 4, fuel vapor in an upper tank space 2a of the fuel tank 2 flows out of the fuel tank 2, as indicated by an arrow in FIG. 3A (which is also referred to as a ventilation path), from a lower side of the casing 10. Since the pressure in the fuel tank 2 (the pressure in the upper tank space) is not increased in this condition, fuel feed can be continuously done.

Figure 3B:
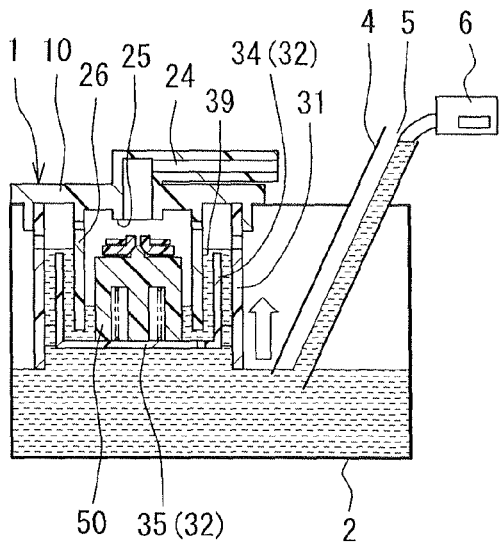

As shown in FIG. 3B, when the fuel feed is further done, the fuel liquid level (the fuel liquid surface) in the fuel tank 2 reaches at the lower end of the outer cylindrical portion 31 of the casing 10, to thereby close a lower opening portion of the outer cylindrical portion 31. Then, the above ventilation path (the path indicated by the arrow in FIG. 3A) in the fuel tank 2 is shut off, so that the pressure in the fuel tank 2 (the pressure in the upper tank space 2a of the fuel tank 2) will be increased. As a result, the fuel liquid level in the outer cylindrical portion 31 (at the outer side of the vessel portion 32) is raised to become higher than the upper end of the side wall portion 34.

Then, the liquid fuel overleaps the upper end of the side wall portion 34 and flows into the vessel portion 32 through the inlet port 39 (that is, the annular clearance portion 34b), so that the fuel liquid level in the vessel portion 32 is raised.

Figure 3C:
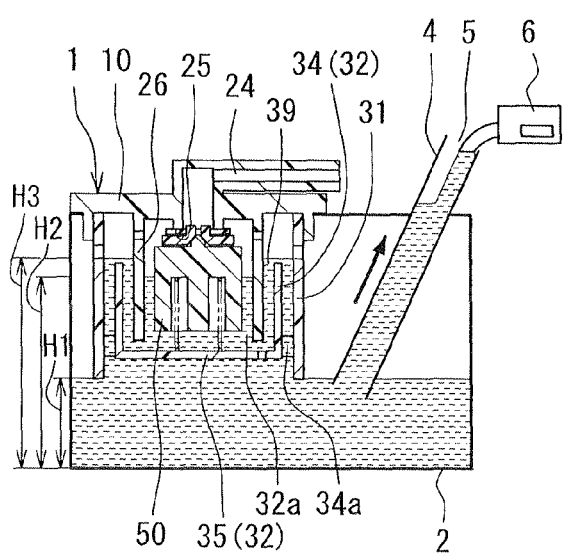

When the fuel liquid level is raised in the vessel portion 32, the float valve unit 50 is lifted up along the float guiding portion 26, as shown in FIG. 3C. Then, the valve member 80 (more clearly shown in FIG. 1) of the float valve unit 50 is seated on the valve seat 25 so as to close the lower end of the ventilation passage 24 (a valve closed condition).

The fuel liquid level in the fuel tank 2 of this condition (that is, a height H1 from a bottom of the fuel tank 2 as shown in FIG. 3C) is referred to as a first predetermined level. The fuel liquid level in the float accommodating space 32a of the vessel portion 32, more exactly in the space 32a of the vessel portion 32 inside of the float guiding portion 26 (that is, a height H2 from the bottom of the fuel tank 2 as shown in FIG. 3C) is referred to as a second predetermined level. And the fuel liquid level in the annular gap 34a between the side wall portion 34 of the vessel portion 32 and the outer cylindrical portion 31 (that is, a height H3 from the bottom of the fuel tank 2 as shown in FIG. 3C) is referred to as a third predetermined level. And the relation among those heights is H3>H2>H1.

The fuel liquid level (H1) of the first predetermined level corresponds almost to the fuel filled-up level in the fuel tank 2. The fuel liquid level (H2) of the second predetermined level corresponds to such a fuel liquid level, with which the float valve unit 50 is floated up by the liquid fuel in the vessel portion 32 and moved up to the valve closing position for closing the ventilation passage 24. And the fuel liquid level (H3) of the third predetermined level corresponds to a liquid fuel level almost equal to the upper end portion of the side wall portion 34.

When the float valve unit 50 is in the valve closed condition, the rise of the fuel liquid level in the casing 10 is stopped. However, when the fuel is further fed into the fuel tank 2, the pressure in the upper tank space 2a of the fuel tank 2 is correspondingly increased. As a result, the fuel liquid level in the fuel feed pipe 4 is raised. When the fuel liquid level reaches at a forward end of the fuel feeding gun 6, the fuel feed is terminated, for example, by an automatic fuel stop mechanism.

Figure 3D:
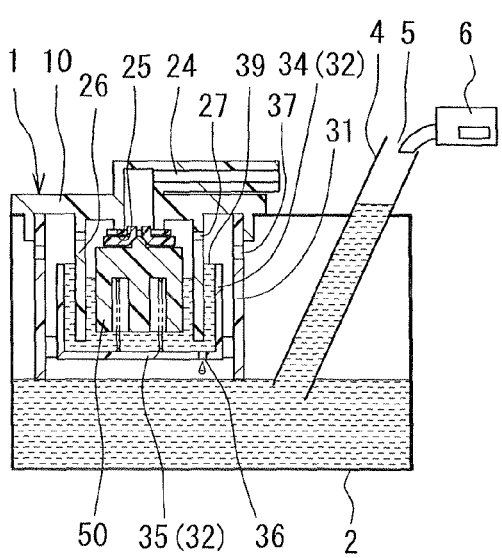

When the fuel feed is terminated, the pressure in the casing and the pressure in the upper tank space 2a of the fuel tank 2 are gradually counterbalanced, because the inside space of the casing 10 and the upper tank space 2a are communicated with each other through the first and second ventilating apertures 27 and 37. As a result, as shown in FIG. 3D, the liquid fuel in the outer cylindrical portion 31 at the outside of the vessel portion 32 (the liquid fuel in the annular gap 34a), namely the liquid fuel in the casing 10 except for the liquid fuel in the vessel portion 32, flows out from the inside space of the casing 10 in a relatively short period through the lower opening portion of the outer cylindrical portion 31. In this situation, the liquid fuel is held in the vessel portion 32, so that the float valve unit 50 (lifted up by the liquid fuel in the vessel portion 32) maintains the valve closed condition. Since the fuel liquid level in the fuel feed pipe 4 is thus maintained at the level for terminating the fuel feed, the additional fuel feed may not be done.

Since the fuel drain through-hole 36 having the relatively small diameter is formed at the closed end bottom 35 of the vessel portion 32, the liquid fuel in the vessel portion 32 is gradually discharged through the fuel drain through-hole 36. The float valve unit 50 is gradually moved in the downward direction, so that the valve member 80 is finally separated from the valve seat 25 to open the lower end of the ventilation passage 24. Since the float valve unit 50 is changed to its valve opened condition, as above, it becomes possible to ventilate the inside of the fuel tank 2, even when the liquid fuel in the fuel tank 2 is at its fuel filled-up level.

In the conditions shown in FIGS. 3A to 3D, the projecting portion 62 (more clearly shown in FIG. 1) of the float 60 closes the small aperture 72. When the float valve unit 50 is moved in the downward direction, for example, from a position shown in FIG. 3D, the projecting portion 62 opens at first the small aperture 72. Pressure difference between the float accommodating space 32a of the casing 10 and the ventilation passage 24 is thereby decreased, so that it makes easier that the valve member 80 is separated from the valve seat 25 to open the ventilation passage 24. The valve member 80 is also referred to a first valve member of a large diameter, while the projecting portion 62 is referred to a second valve member of a small diameter.

When the float valve unit 50 becomes to the valve opened condition, the fuel liquid level is lowered in the fuel feed pipe 4. According to the fill-up control valve device 1 of the present embodiment, however, the valve closed condition shown in FIG. 3D is maintained for a period of one to three minutes, depending on designs of inside volume of the vessel portion 32 and an inner diameter of the fuel drain through-hole 36. When the float valve unit 50 is changed from the valve closed condition to the valve opened condition and the fuel liquid level is lowered in the fuel feed pipe 4, a process of the fuel feed is already ended, so that the additional fuel feed may not be done.

According to the above structure and operation, the casing has the vessel portion 32, in which the float valve unit 50 is provided and the fuel drain through-hole 36 of the small diameter is formed at the closed end bottom 35 of the vessel portion 32. The minimum value for the cross sectional area of the fuel drain through-hole 36 is made to be the value, which is extremely smaller than the opening area of the inlet port 39, so that fuel discharge speed of the liquid fuel from the vessel portion 32 through the fuel drain through-hole 36 is suppressed to a small value. As a result, it is possible to keep the time period longer, during which the liquid fuel introduced into the vessel portion 32 from the inlet port 39 is held in the vessel portion 32. In other words, the time period for keeping the float valve unit 50 in the valve closed condition can be made longer.

A comparative example will be explained with reference to FIGS. 15A to 15D, wherein the vessel portion is not provided in a fill-up control valve device 901. The fill-up control valve device 901 does not have, either, an outer cylindrical portion at a casing 910. A bottom of a float guiding portion 926 is covered by a plate member 931 having ventilation holes, each of which has a large cross sectional area. The ventilation holes are inlet ports and outlet ports, through which the liquid fuel flows into the casing 910 or flows out from the casing 910 when the liquid fuel is filled up in the fuel tank.

Figure 15A:
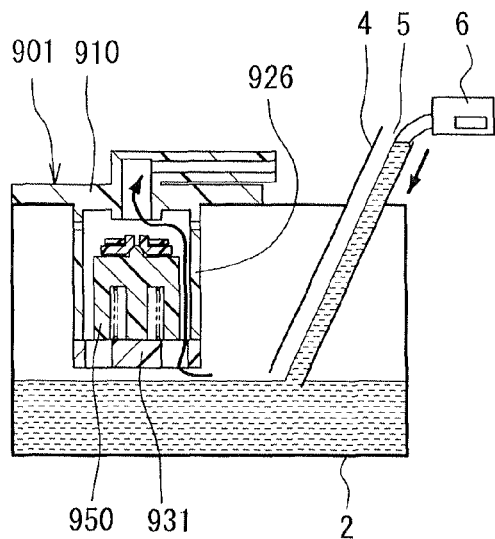
FIGS. 15A to 15D are schematic cross sectional views for explaining operation of a fill-up control valve device of a comparative example when liquid fuel is fed into a fuel tank.

As shown in FIG. 15A, a float valve unit 950 is in a valve opened condition, when the fuel liquid level is lower than the fuel filled-up level in the fuel tank 2, to which the fill-up control valve device 901 is attached. When the liquid fuel is fed into the fuel tank 2 from the fuel feeding gun 6 through the fuel feeding port 5 of the fuel feed pipe 4, fuel vapor in the upper tank space of the fuel tank 2 flows out of the fuel tank 2, as indicated by an arrow in FIG. 15A, from the lower side of the casing 910. Since the pressure in the fuel tank 2 is not increased, fuel feed can be continuously done.

Figure 15B:
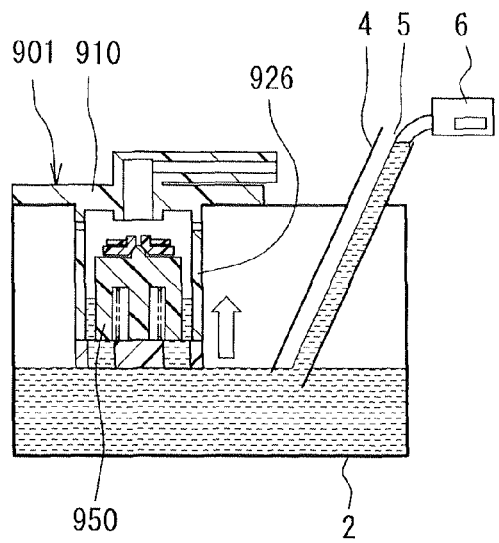

As shown in FIG. 15B, when the fuel feed is further done, the fuel liquid level in the fuel tank 2 reaches at a lower end of the casing 910, to thereby close the ventilation holes formed at a lower portion (the plate member 931) of the casing 910. Then, a ventilation path indicated by an arrow in FIG. 15A in the fuel tank 2 is shut off, so that the pressure in the fuel tank 2 will be increased. As a result, the fuel liquid level is raised in the casing 910.

Figure 15C:
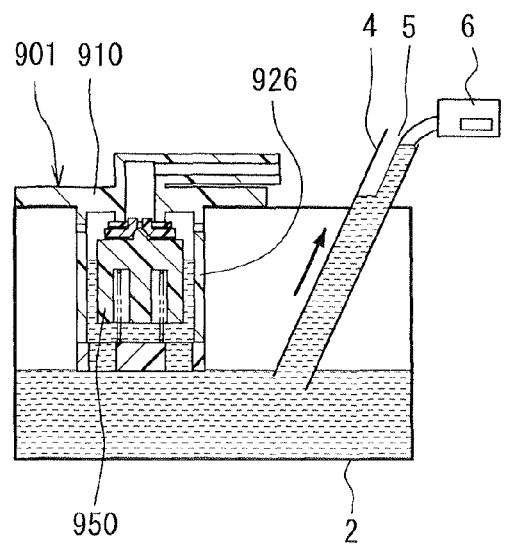

When the fuel liquid level is raised in the casing 910, the float valve unit 950 is floated up. As shown in FIG. 15C, the float valve unit 950 is changed to a valve closed condition. When the float valve unit 50 is in the valve closed condition, the rise of the fuel liquid level in the casing 910 is stopped. Then, the fuel liquid level in the fuel feed pipe 4 is raised due to the further pressure increase in the fuel tank 2. When the fuel liquid level reaches at the forward end of the fuel feeding gun 6, the fuel feed is terminated by the automatic fuel stop mechanism.

Figure 15D:
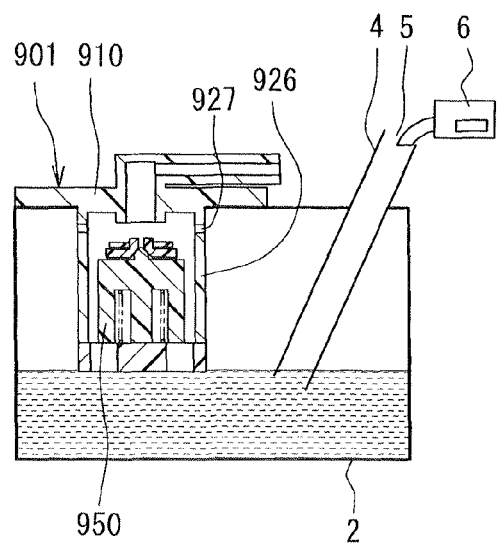

When the fuel feed is terminated, as shown in FIG. 15D, the pressure in the casing 910 and the pressure in the upper tank space of the fuel tank 2 are gradually counterbalanced with each other through ventilating apertures 927 of a small diameter, which are formed at an upper portion of the casing 910. As a result, the liquid fuel in the casing 910 flows out from the inside space of the casing 910 in a relatively short period through the ventilation holes formed in the plate member 931. Then, the float valve unit 950 is changed to the valve opened condition and the fuel liquid level in the fuel feed pipe 4 is lowered, so that additional fuel feed more than the fuel filled-up level may become possible.

According to the fill-up control valve device 1 of the present embodiment, however, it is possible to prevent the additional fuel feed more than the fuel filled-up level. In addition, a number of parts and components for the fill-up control valve device 1 of the present embodiment may not be increased when compared with the comparative example.

According to the fuel drain through-hole 36 for the vessel portion 32 of the present embodiment, the through-hole 36 has the tapered inner peripheral surface in such a manner that the cross sectional area is gradually decreased from the upper end toward the lower end thereof. Namely, the fuel enters into the through-hole 36 from its upper open end, at which the cross sectional area is maximum, and passes through the through-hole 36 the cross sectional area of which is gradually reduced. As a result, an adverse effect of surface tension by the liquid fuel may be suppressed and thereby a stable flow characteristic can be realized. In addition, the time period for keeping the valve closed condition of the float valve unit 50 can be stabilized.

(Second Embodiment)

A second embodiment of the present invention will be explained with reference to FIG. 4.

The second embodiment differs from the first embodiment in a structure of the fuel drain through-hole formed at the closed end bottom of the vessel portion 32. The same reference numerals to the first embodiment are used in the second embodiment for designating the same or similar parts to the first embodiment.

Figure 4:
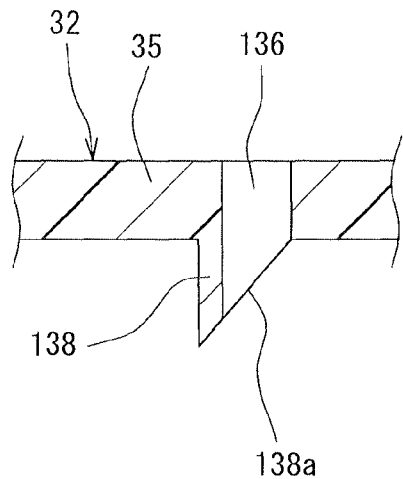
FIG. 4 is a schematic cross sectional view showing a relevant portion of the vessel portion 32 of the fill-up control valve device 1 according to a second first embodiment.

As shown in FIG. 4, according to the present embodiment, a fuel drain through-hole 136, having a small diameter, is formed at the closed end bottom 35 of the vessel portion 32, so that the through-hole 136 passes through the closed end bottom 35 in the vertical direction. An inner peripheral surface of the fuel drain through-hole 136 is a cylindrical surface, so that a cross sectional area of the through-hole 136 has the same value from its upper end to a lower end. As in the same manner to the first embodiment, the cross sectional area of the through-hole 136 is made to be extremely smaller than the area of the upper opening portion of the inlet port 39.

An annular projecting portion 138, which is projected in the downward direction, is integrally formed at a lower surface of the closed end bottom 35 of the vessel portion 32. The annular projecting portion 138 is continuously connected to the fuel drain through-hole 136, so that an inner diameter of the annular projecting portion 138 is equal to that of the through-hole 136. An inclined surface portion 138a is formed at a lower end of the annular projecting portion 138, wherein a surface of the inclined surface portion 138a is inclined with respect to a longitudinal axial line of the through-hole 136.

According to the above structure, it is possible to make the liquid fuel (which will be discharged through the fuel drain through-hole 136) to stably flow along the annular projecting portion 138. The annular projecting portion 138 thus functions as a guiding member for the liquid fuel to be discharged from the vessel portion 32. It is, therefore, easier to stabilize the flow characteristic of the liquid fuel to be discharged. Even according to the present embodiment, it is possible to stabilize the time period for keeping the valve closed condition of the float valve unit 50.

(Third Embodiment)

A third embodiment of the present invention will be explained with reference to FIGS. 5 to 9.

The third embodiment differs from the first embodiment in that a fuel pooling tank, into which the liquid fuel flows from the vessel portion 32, is provided. The same reference numerals to the first embodiment are used in the third embodiment for designating the same or similar parts to the first embodiment.

Figure 5:
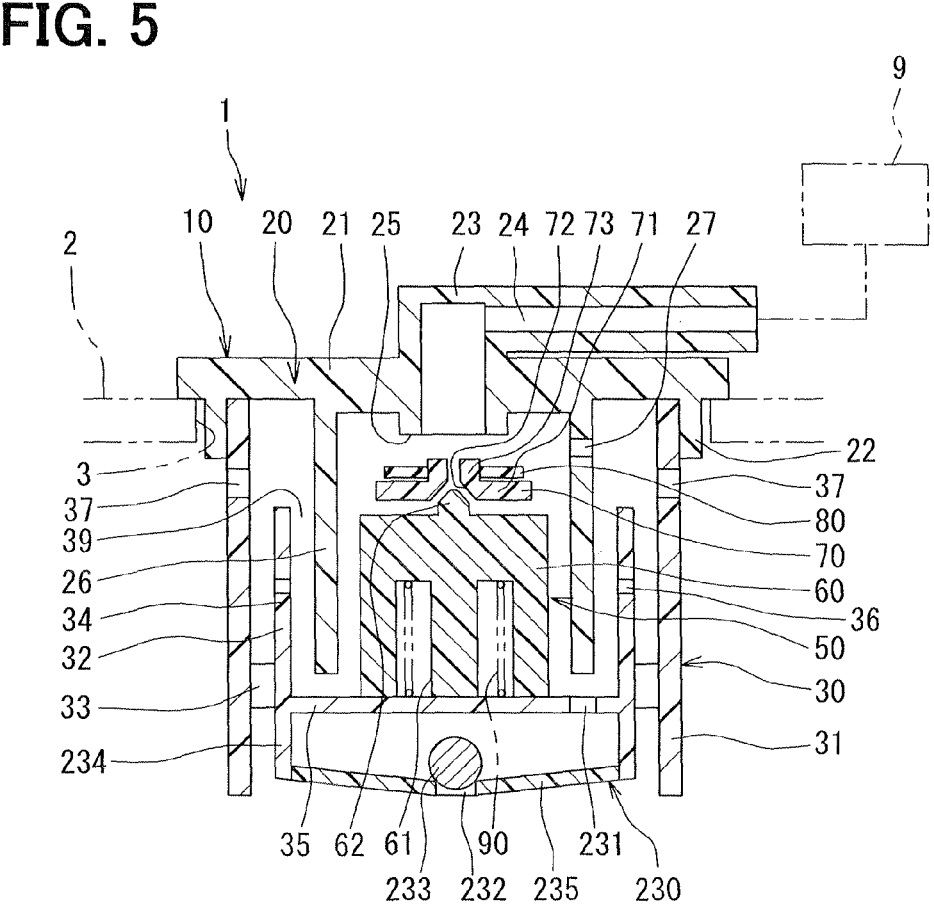
FIG. 5 is a schematic cross-sectional view showing an outlined structure of the fill-up control valve device 1 according to a third embodiment.

As shown in FIG. 5, the fill-up control valve device 1 is fixed to the ceiling portion of the fuel tank 2 of the vehicle, and a fuel pooling portion 230 (corresponding to the fuel pooling tank) is formed at a lower side of the vessel portion 32 of the casing 10.

An annular extending portion 234 is provided at the lower casing part 30 of the casing 10 in such a manner that the annular extending portion 234 extends in the downward direction from an outer periphery of the closed end bottom 35 of the vessel portion 32. The annular extending portion 234 is integrally formed with the vessel portion 32. A lower surface portion 235, made of for example resin, is welded to a lower end of the annular extending portion 234, so as to close a lower opening portion of the annular extending portion 234.

In other words, the fuel pooling portion 230 is integrally formed with the vessel portion 32 at its lower end, so that the closed end bottom 35 of the vessel portion 32 constitutes a ceiling surface for the fuel pooling portion 230.

A fuel inlet aperture 231 is formed at the closed end bottom 35 of the vessel portion 32. The fuel inlet aperture 231 communicates the inside of the vessel portion 32 to the inside of the fuel pooling portion 230, so that the liquid fuel may flow from the vessel portion 32 into the fuel pooling portion 230.

According to the present embodiment, the fuel drain through-hole 36 is formed at the side wall portion 34 of the vessel portion 32. When the fuel liquid level in the vessel portion 32 is at such a level equal to a position of the fuel drain through-hole 36, the float valve unit 50 is separated from the valve seat 25 to open the ventilation passage 24.

A fuel discharge aperture 232 is formed at the lower surface portion 235 of the fuel pooling portion 230, for example, at a center of the lower surface portion 235. The lower surface portion 235 has a tapered inner surface such that a surface position becomes higher as a distance from the fuel discharge aperture 232 becomes longer in a radial direction. As shown in FIG. 5, the lower surface portion 235 is formed as a whole in a tapered shape. However, at least the inner surface (an upper side surface) of the lower surface portion 235 may be formed as the tapered surface, so that the inner surface is gradually lowered toward the fuel discharge aperture 232.

A ball-shaped valve member 233 is movably accommodated in the inside of the fuel pooling portion 230, wherein a diameter of the valve member 233 is larger than a diameter of the fuel discharge aperture 232. The ball-shaped valve member 233 is made of, for example, metal, so that a specific gravity thereof is larger than that of the liquid fuel. Therefore, the ball-shaped valve member 233 may not be floated up, even when the liquid fuel enters into the fuel pooling portion 230.

Since the inner surface of the lower surface portion 235 of the fuel pooling portion 230 is formed as the tapered surface, the ball-shaped valve member 233 closes an upper open end of the fuel discharge aperture 232, when the vehicle (in which the fill-up control valve device 1 of the present embodiment is fixed to the fuel tank 2) is stopped, in other words, when neither acceleration nor deceleration is applied to the ball-shaped valve member 233 in a horizontal direction of FIG. 5).

On the other hand, when the vehicle starts its movement (when the acceleration or the deceleration is applied to the valve member 233 in the horizontal direction of FIG. 5), the ball-shaped valve member 233 moves in the horizontal direction by its inertia with respect to the casing 10, to thereby open the upper open end of the fuel discharge aperture 232.

A peripheral portion of the upper open end of the fuel discharge aperture 232 functions as a valve seat for the ball-shaped valve member 233. Therefore, the valve seat and the valve member 233 constitute a valve unit for opening and/or closing the fuel discharge aperture 232, so that the fuel discharge aperture 232 is closed when the vehicle is in its stopped condition, while the fuel discharge aperture 232 is opened when the vehicle starts its traveling movement.

A cross sectional area (a passage area) of the fuel inlet aperture 231 is made larger than that of the fuel drain through-hole 36. Therefore, when there is a space for the liquid fuel in the fuel pooling portion 230 (namely, when the fuel pooling portion 230 is not fully filled with the liquid fuel), and when the liquid fuel enters into the vessel portion 32, flow-in of the liquid fuel into the fuel pooling portion 230 through the fuel inlet aperture 231 is more preferentially done than flow-out of the liquid fuel through the fuel drain through-hole 36.

In addition, the cross sectional area (the passage area) of the fuel inlet aperture 231 is made larger than that of the fuel discharge aperture 232. The fuel discharge aperture 232 is made to be as small as possible, for example, 1 mm in diameter, so that the ball-shaped valve member 233 can be made smaller. A diameter of the fuel inlet aperture 231 may be such a value, that the liquid fuel may be temporally held in the vessel portion 32 when the liquid fuel is fed into the fuel tank 2. Therefore, the diameter of the fuel inlet aperture 231 can be made to be larger (for example, 1.5 mm) than that of the fuel discharge aperture 232.

An operation of the fill-up control valve device 1 according to the above embodiment will be explained.

As shown in FIG. 5, the float valve unit 50 is in the valve opened condition, when the fuel liquid level is lower than the fuel filled-up level in the fuel tank 2, to which the fill-up control valve device 1 is attached. As in the same manner to the first embodiment, when the liquid fuel is fed into the fuel tank 2 from the fuel feeding gun 6 through the fuel feeding port 5 of the fuel feed pipe (the fuel inlet pipe) 4 (as shown in FIG. 3A), the fuel vapor in the upper tank space 2a of the fuel tank 2 flows out of the fuel tank 2 from the lower side of the casing 10. Since the pressure in the fuel tank 2 is not increased, fuel feed can be continuously done.

When the fuel feed is further done, the fuel liquid level in the fuel tank 2 reaches at the lower end of the outer cylindrical portion 31 of the casing 10, to thereby close the lower opening portion of the outer cylindrical portion 31. Then, the ventilation path in the fuel tank 2 is shut off, so that the pressure in the fuel tank 2 will be increased. As a result, the fuel liquid level in the outer cylindrical portion 31 is raised to become higher than the upper end of the side wall portion 34. Then, the liquid fuel overleaps the upper end of the side wall portion 34 and flows into the vessel portion 32 through the inlet port 39, so that the fuel liquid level in the vessel portion 32 is raised.

Figure 6:
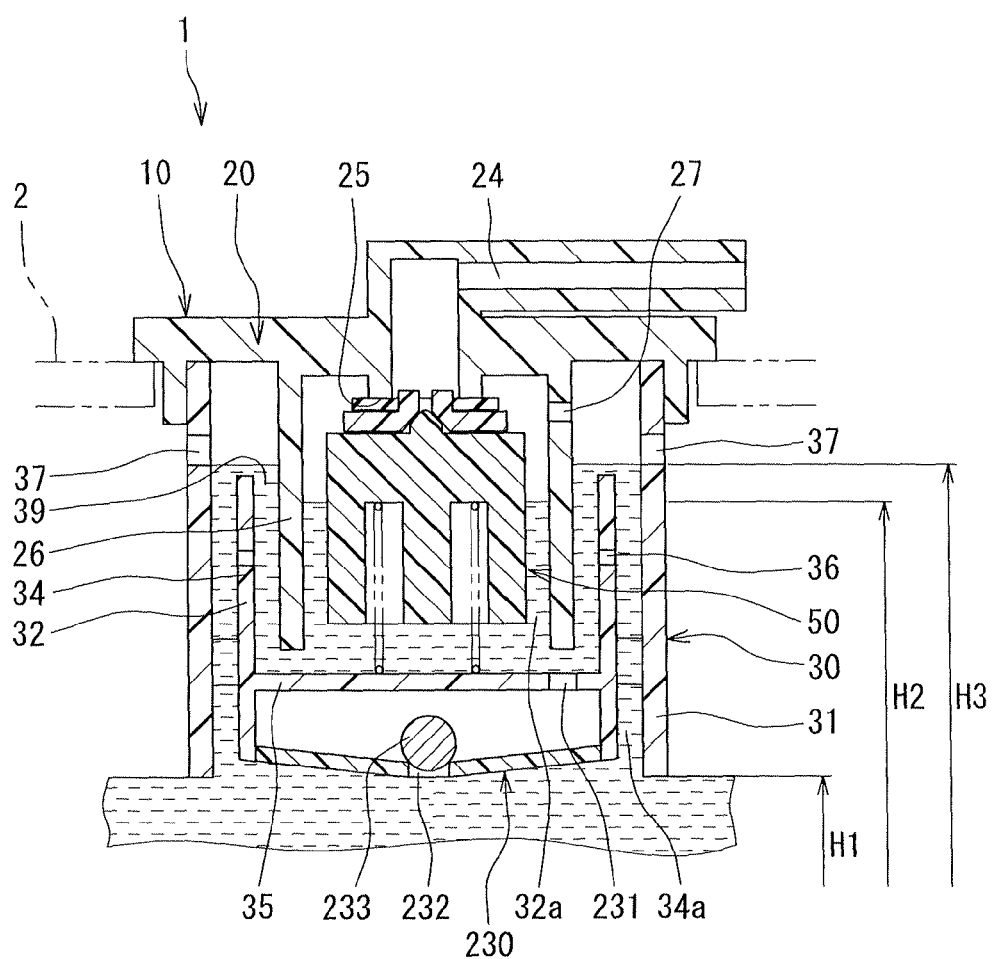
FIGS. 6 to 9 are schematic cross sectional views for explaining operation of the fill-up control valve device 1 of the third embodiment.

When the fuel liquid level is raised in the vessel portion 32, the float valve unit 50 is floated up along the float guiding portion 26, as shown in FIG. 6. Then, the valve member 80 of the float valve unit 50 is seated on the valve seat 25 so as to close the lower end of the ventilation passage 24 (the valve closed condition).

As in the same manner to the first embodiment, the fuel liquid level (H1) in the fuel tank 2 of this condition is referred to as the first predetermined level. The fuel liquid level (H2) in the space 32a of the vessel portion 32 inside of the float guiding portion 26 (that is, the float accommodating space) is referred to as the second predetermined level. And the fuel liquid level (H3) in the annular gap 34a between the side wall portion 34 of the vessel portion 32 and the outer cylindrical portion 31 is referred to as the third predetermined level.

The above operation so far is the same to that of the first embodiment, which has been explained with reference to FIGS. 3A to 3C.

When the float valve unit 50 is in the valve closed condition, as shown in FIG. 6, the rise of the fuel liquid level in the casing 10 is stopped. However, when the liquid fuel is further fed into the fuel tank 2, the pressure in the upper tank space of the fuel tank 2 is correspondingly increased. As a result, the fuel liquid level in the fuel feed pipe 4 is raised due to the pressure increase. When the fuel liquid level reaches at the forward end of the fuel feeding gun 6, the fuel feed is terminated, for example, by the automatic fuel stop mechanism.

Figure 7:
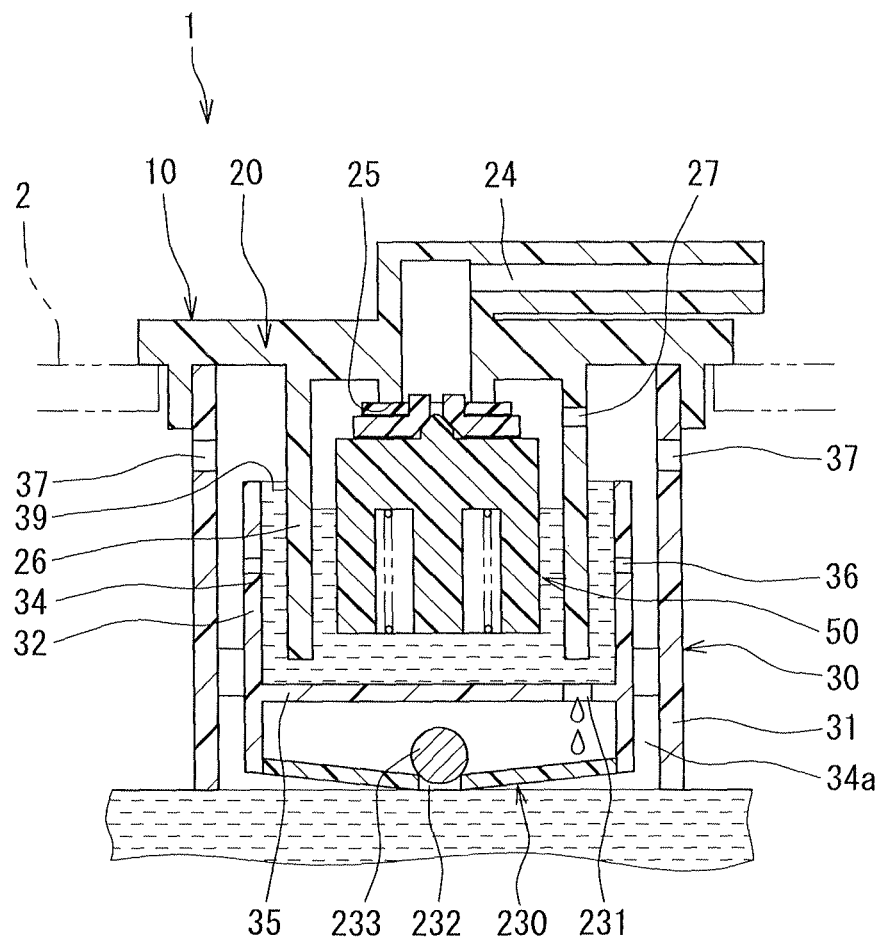

When the fuel feed is terminated, the pressure in the casing (including the float accommodating space 32a) and the pressure in the upper tank space 2a of the fuel tank 2 are gradually counterbalanced, because the inside space of the casing 10 and the upper tank space 2a are communicated with each other through the first and second ventilating apertures 27 and 37. As a result, as shown in FIG. 7, the liquid fuel in the outer cylindrical portion 31 at the outside of the vessel portion 32 (the liquid fuel in the annular gap 34a), namely the liquid fuel in the casing 10 except for the liquid fuel in the vessel portion 32, flows out from the inside space of the casing 10 in the relatively short period through the lower opening portion of the outer cylindrical portion 31.

Figure 8:
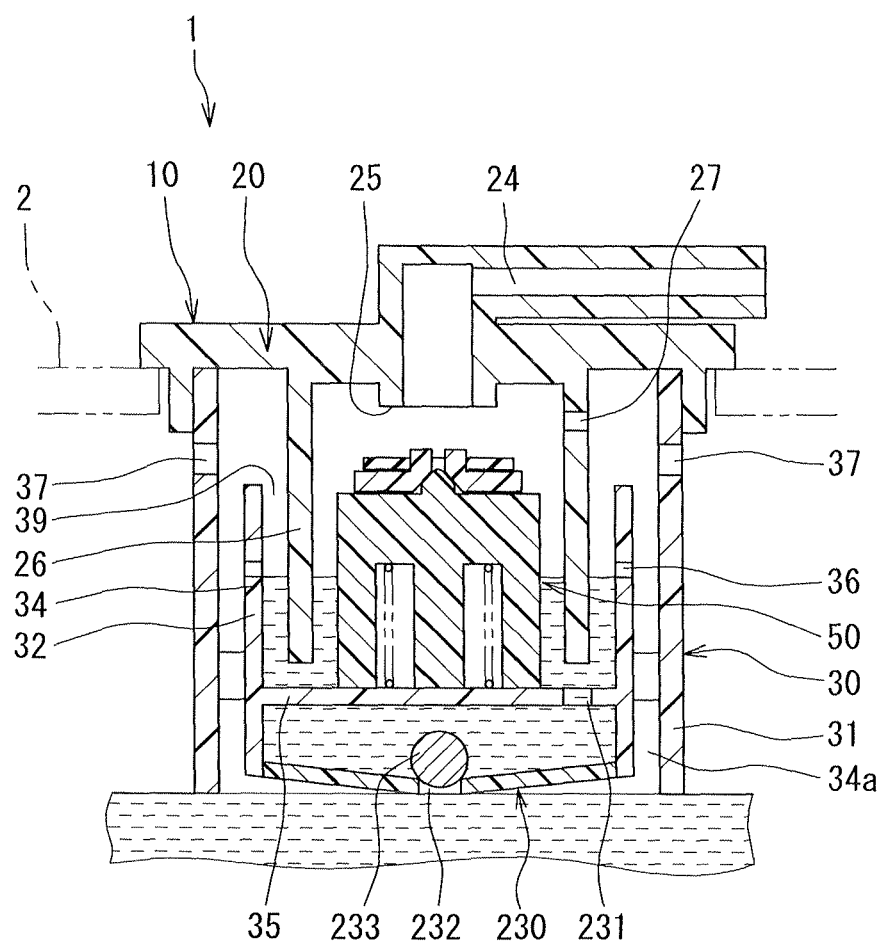

In this situation, a part of the liquid fuel in the vessel portion 32 flows into the fuel pooling portion 230 through the fuel inlet aperture 231 in a relatively short period. As shown in FIG. 8, when the fuel pooling portion 230 is fully filled with the liquid fuel from the vessel portion 32 through the inlet aperture 231, the liquid fuel in the vessel portion 32 is reduced, wherein a volume of such reduced liquid fuel corresponds to an inner volume of the fuel pooling portion 230. As a result, the fuel liquid level in the vessel portion 32 is lowered.

The float valve unit 50 is moved in the downward direction in response to the decrease of the fuel liquid level, so that the float valve unit 50 is separated from the valve seat 25 to open the lower end of the ventilation passage 24. Then, the pressure increase in the fuel tank 2 is removed and the fuel liquid level in the fuel feed pipe 4 is lowered, so that additional fuel feed may become possible.

In the above operation, in which the liquid fuel flows from the vessel portion 32 into the fuel pooling portion 230, it may not always be necessary that an amount of the liquid fuel corresponding to the inner volume of the fuel pooling portion 230 flows into the fuel pooling portion 230 in order that the float valve unit 50 is moved in the downward direction to open the ventilation passage 24. The float valve unit 50 may be moved in the downward direction, when only a part of the liquid fuel, namely the liquid fuel smaller than the amount corresponding to the inner volume of the fuel pooling portion 230, has flown into the fuel pooling portion 230.

When the liquid fuel is further fed by the fuel feeding gun into the fuel feed port, the fuel liquid level is raised within the outer cylindrical portion 31. Then, the liquid fuel overleaps the upper end of the side wall portion 34 and flows into the vessel portion 32 through the inlet port 39, so that the fuel liquid level in the vessel portion 32 is raised.

When the fuel liquid level is raised in the vessel portion 32, the float valve unit 50 is floated up again along the float guiding portion 26. Then, the valve member 80 of the float valve unit 50 is seated on the valve seat 25 (as shown in FIG. 6) so as to close the lower end of the ventilation passage 24 (the valve closed condition).

When the float valve unit 50 is in the valve closed condition, the rise of the fuel liquid level in the casing 10 is stopped. The fuel liquid level in the fuel feed pipe 4 is raised due to the pressure increase in the fuel tank 2. When the fuel liquid level reaches at the forward end of the fuel feeding gun 6, the fuel feed is terminated, for example, by the automatic fuel stop mechanism.

When the fuel feed is terminated, the pressure in the casing (including the float accommodating space 32a) and the pressure in the upper tank space 2a of the fuel tank 2 are gradually counterbalanced, because the inside space of the casing 10 and the upper tank space 2a are communicated with each other through the first and second ventilating apertures 27 and 37. As a result, the liquid fuel in the outer cylindrical portion 31 at the outside of the vessel portion 32 (the liquid fuel in the annular gap 34a) flows out from the inside space of the casing 10 in the relatively short period through the lower opening portion of the outer cylindrical portion 31.

In this situation, since the fuel pooling portion 230 has been already fully filled up with the liquid fuel, the liquid fuel is discharged from the vessel portion 32 only through the fuel drain through-hole 36. Therefore, the fuel liquid level in the vessel portion 32 is slowly lowered, so that the float valve unit 50 is kept at its valve closed condition until the fuel liquid level is lowered to a certain liquid level in the vessel portion 32, that is a position corresponding to the fuel drain through-hole 36. As a result, the fuel liquid level in the fuel feed pipe 4 is maintained at the level for automatically terminating the fuel feed, and thereby the additional fuel feed can not be done.

Since the fuel drain through-hole(s) 36 having the relatively small diameter is formed at the side wall portion 34 of the vessel portion 32, the liquid fuel in the vessel portion 32 is slowly discharged through the fuel drain through-hole(s) 36. The float valve unit 50 is gradually moved in the downward direction, so that the valve member 80 is finally separated from the valve seat 25 to open the lower end of the ventilation passage 24. Since the float valve unit 50 is changed to its valve opened condition, as above, it becomes possible to ventilate the inside of the fuel tank 2, even when the liquid fuel in the fuel tank 2 is at its fuel filled-up level.

When the float valve unit 50 is changed to the valve opened condition, the fuel liquid level is lowered in the fuel feed pipe 4. According to the fill-up control valve device 1 of the present embodiment, the valve closed condition is maintained for a period of one to three minutes, depending on designs of inside volume of the vessel portion 32 and an inner diameter of the fuel drain through-hole(s) 36. Therefore, when the float valve unit 50 is changed from the valve closed condition to the valve opened condition and the fuel liquid level is lowered in the fuel feed pipe 4, the process of the fuel feed is already ended. As a result, the additional fuel feed can not be done.

When the process for feeding the fuel is being carried out, the vehicle is stopped (in the stop condition). The ball-shaped valve member 233, therefore, keeps its valve closed condition for the fuel discharge aperture 232. The liquid fuel, which is filled in the fuel pooling portion 230, may not be discharged from the fuel pooling portion 230 during the fuel feeding process.

Figure 9:
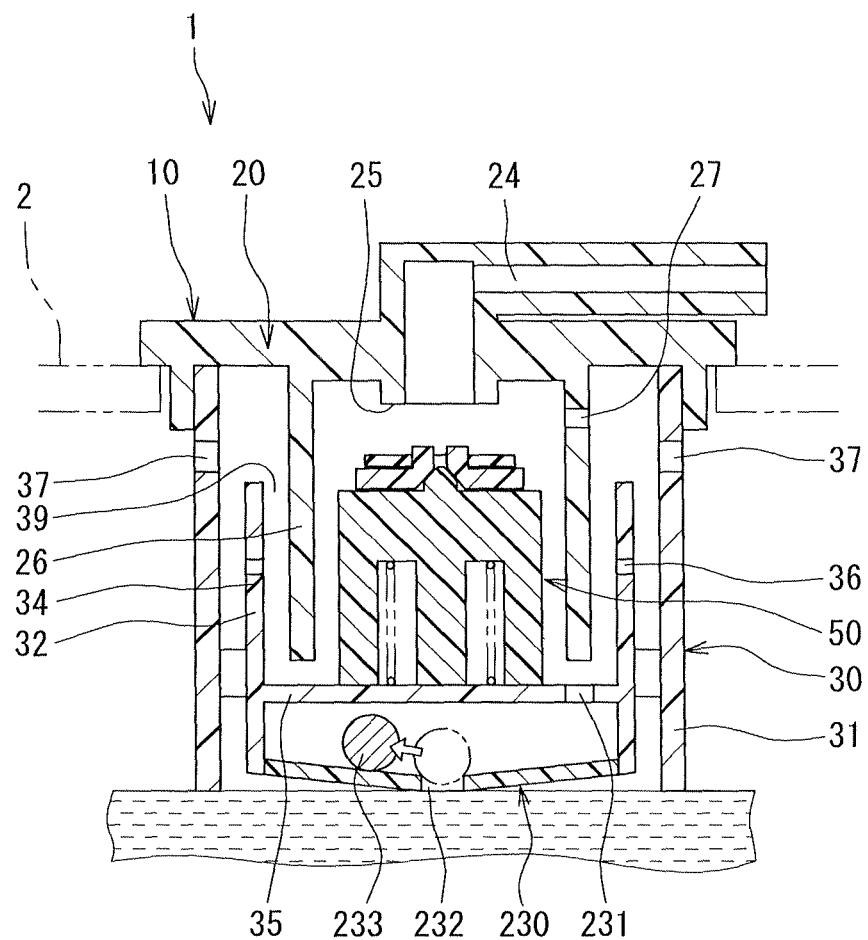

When the vehicle starts its movement after the fuel feeding process has been ended, as shown in FIG. 9, the ball-shaped valve member 233 moves in the horizontal direction by its inertia with respect to the casing 10, to thereby open the fuel discharge aperture 232. Then, the liquid fuel pooled in the fuel pooling portion 230 is discharged at a dash into the fuel tank 2. Therefore, when the fuel feeding process is done next time, the fuel pooling portion 230 is not filled with the liquid fuel and almost empty.

The liquid surface in the fuel tank may be agitated during the vehicle traveling, and the liquid fuel may enter into the vessel portion 32 and thereby the float valve unit 50 may be temporally moved to the valve closing position. However, the ball-shaped valve member 233 is moved relative to the casing 10 by the acceleration and/or deceleration of the vehicle, so that the liquid fuel in the vessel portion 32 is smoothly discharged through the fuel pooling portion 230. Therefore, the float valve unit 50 may not be maintained at the valve closed condition.

Even when the vehicle is kept in the stopped condition after the fuel feeding process has been ended, the liquid fuel in the vessel portion 32 is very slowly discharged through the fuel drain through-hole(s) 36 formed at the side wall portion 34 of the vessel portion 32. Therefore, the float valve unit 50 is changed from the valve closed condition to the valve opened condition after the relatively long period (for example, one to three minutes), and the fuel tank 2 is ventilated.

According to the above structure and operation, spill over of the fuel from the fuel feeding port 5 can be prevented during the fuel feeding process.

When the liquid fuel is fed into the fuel tank from the fuel feed pipe by the fuel feeding gun having the automatic stopping mechanism, a larger amount of the liquid fuel is fed in a first fuel feeding process until a first automatic stop than a second fuel feeding process until a second automatic stop. Therefore, the liquid fuel is more easily bubbled to generate a larger amount of fuel vapor in the first fuel feeding process than the second fuel feeding process.

Accordingly, when the fill-up control valve device keeps the valve closed condition at the first automatic stop, the inner pressure in the fuel tank may be increased due to the large amount of the fuel vapor, and thereby the fuel may be spilled over from the fuel feeding port. According to the present embodiment, however, it is possible to prevent the fuel from spilling over from the fuel feeding port 5.

According to the present embodiment, as already explained above, the ball-shaped valve member 233 opens the fuel discharge aperture 232 during the vehicle is running. Therefore, when the vehicle is stopped and the fuel feeding process is carried out, the liquid fuel has been already discharged from the fuel pooling portion 230 and almost no liquid fuel remains in the fuel pooling portion 230. In this condition, when the fuel is fed into the fuel tank 2 until the first automatic stop by the first fuel feeding process, the float valve unit 50 is once moved to the valve closing position (and changed to the valve closed condition) but a part of the liquid fuel in the vessel portion 32 immediately flows into the fuel pooling portion 230 so that the float valve unit 50 is moved down in the relatively short period to the valve opened condition. As a result, the pressure increase in the fuel tank 2 can be suppressed. In other words, it is possible to prevent the fuel from spilling out from the fuel feeding port 5 during the first fuel feeding process.

When the vehicle is in the stopped condition and the fuel is being fed, the ball-shaped valve member 233 keeps the valve closed condition for the fuel discharge aperture 232. Therefore, the liquid fuel having entered into the fuel pooling portion 230 during the first fuel feeding process is not discharged. As a result, the liquid fuel flowing into the vessel portion 32 during the second fuel feeding process can be held in the vessel portion 32 during a longer period than that of the first fuel feeding process, so that the valve closed condition for the ventilation passage 24 by the float valve unit 50 can be maintained for the longer period.

As above, the time period for the float valve unit 50 being kept in the valve closed condition in the first fuel feeding process (that is, the fuel feeding process until the first automatic stop) is made relatively shorter, in order to prevent the fuel from spilling out from the fuel feeding port 5. On the other hand, in the second fuel feeding process (that is, the fuel feeding process until the second automatic stop), the time period for the float valve unit 50 being kept in the valve closed condition is made relatively longer, so as to suppress the unfavorable additional fuel feed.

The upper side surface of the lower surface portion 235 for the fuel pooling portion 230 is formed as the tapered surface, so that the upper open end of the fuel discharge aperture 232 is positioned at the lowest position. In addition, the ball-shaped valve member 233 is arranged in the fuel pooling portion 230 to form the valve unit for opening and/or closing the fuel discharge aperture 232. Therefore, when the vehicle is in the stopped condition, the fuel discharge aperture 232 is surely closed by the ball-shaped valve member 233. When the vehicle starts its traveling movement, the fuel discharge aperture 232 is easily opened by the ball-shaped valve member 233, which is moved by the inertia relative to the fuel pooling portion 230. As above, the fuel discharge aperture 232 can be surely and easily closed and/or opened by a simple structure of the valve unit.

The fuel pooling portion 230 is integrally formed with the vessel portion 32 at its lower side. Therefore, it is easy to manufacture the structure, according to which the part of the liquid fuel in the vessel portion 32 flows into the fuel pooling portion 230.

(Modifications)

Some of the preferred embodiments of the present invention are explained above. However, the present invention should not be limited to the above embodiments, but may be modified in various ways without departing from the scope of the present invention.

In the above first embodiment, the inner peripheral surface of the fuel drain through-hole 36 for the vessel portion 32 is formed in the tapered surface, so that the cross sectional area of the fuel passage of the fuel drain through-hole 36 is gradually reduced from the upper end toward the lower end thereof. The invention should not be limited to the embodiment. Namely, the inner peripheral surface should not be limited to such tapered surface, but any other form of the fuel drain through-hole 36 may be used so long as the cross sectional area thereof is gradually reduced from the upper end toward the lower end. In addition, the cross sectional area of the fuel drain through-hole 36 may be the same along the fuel passage from the upper end toward the lower end thereof, so long as the high flow characteristic is realized for the liquid fuel to be discharged.

According to the second embodiment, the annular projecting portion 138 having the inclined surface 138a is formed as the fuel guiding means. The present invention should not be limited to this embodiment. For example, a pin member is provided in the fuel drain through-hole as the fuel guiding means, wherein the pin member projects downwardly toward a position, which is lower than the lower surface of the closed end bottom 35.

In the above embodiments, the casing is composed of the upper and lower casing parts 20 and 30. The present invention should not be limited to this structure, so long as the casing has the vessel portion which has the fuel drain hole at its bottom.

Figure 10:
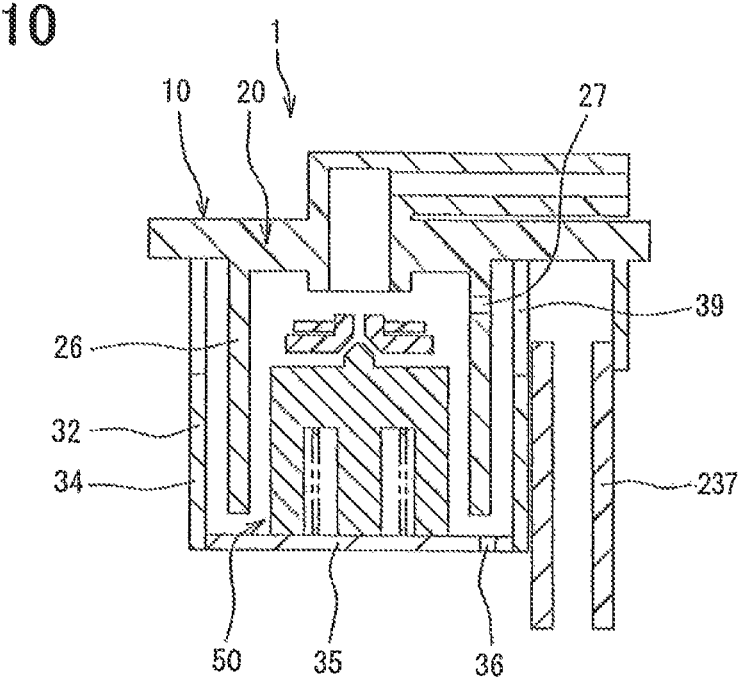
FIGS. 10 to 14 are schematic cross sectional views, each showing an outlined structure of the fill-up control valve device 1 according modified embodiments.

In a modification of the first embodiment, for example, as shown in FIG. 10, the outer cylindrical portion 31 (of the first embodiment) is not provided, the side wall portion 34 of the vessel portion 32 is provided as a part of the upper casing part 20, a plate member (which is structured as the closed end bottom 35) is fixed by welding to the lower end of the side wall portion 34, and a pipe member 237 which rises up the fuel liquid level within the casing 10 for supplying the liquid fuel into the vessel portion 32 is provided at the side wall portion 34. According to such a modification, a radial dimension of the fill-up control valve device 1 can be made smaller.

Figure 11:
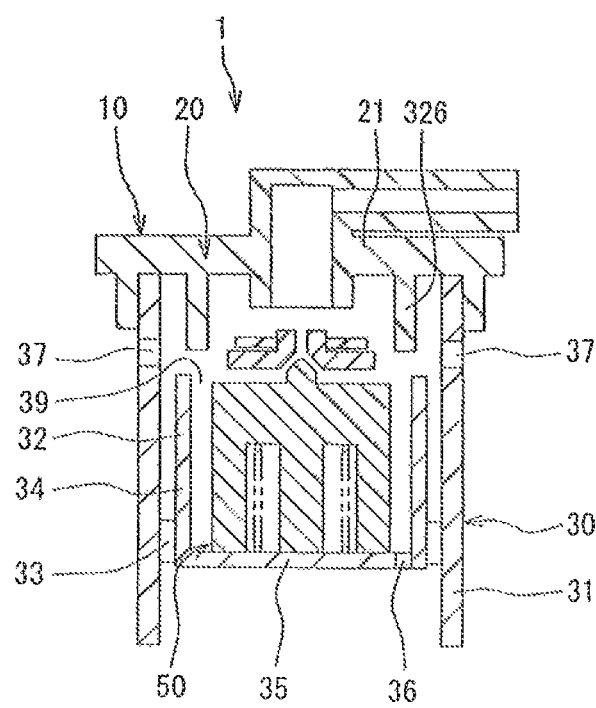

In another modification of the first embodiment, for example, as shown in FIG. 11, the float guiding portion 26 of the upper casing part 20 is removed, and instead the side wall portion 34 of the vessel portion 32 may have a function for guiding the float valve unit 50. In other words, the float guiding portion and the vessel portion 32 are formed as one element. According to such a modification, it is not necessary to provide the guiding member for the float valve unit 50 separately from the vessel portion 32, and thereby it is possible to simplify the structure of the casing and to reduce a size thereof. According to the modified fill-up control valve device 1 shown in FIG. 11, an annular partitioning wall 326 is provided at the upper casing part 20 in such a manner that the annular partitioning wall 326 downwardly extending from the flat plate portion 21. The annular partitioning wall 326 prevents the liquid fuel, which is upwardly pushed in a space between the outer cylindrical portion 31 and the vessel portion 32, from directly reaching at a sealing portion of the float valve unit in the valve closed condition.

Figure 12:
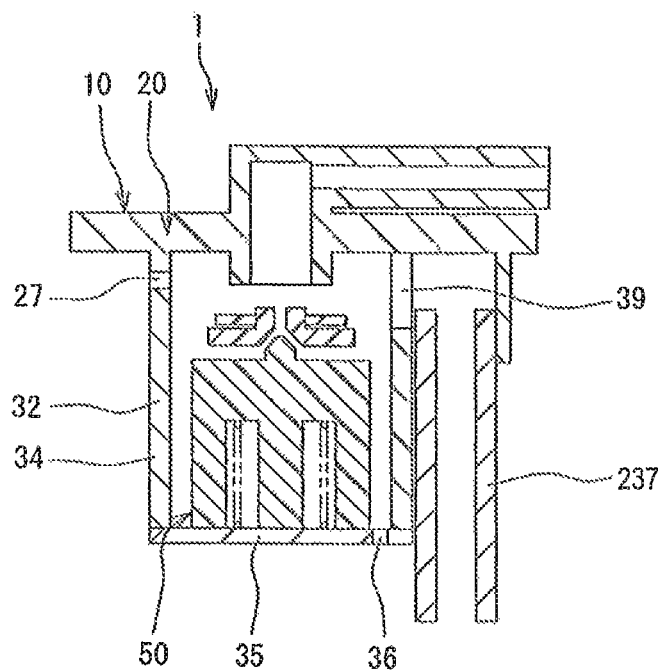

In a further modification of the modified embodiment of FIG. 10, for example, as shown in FIG. 12, the side wall portion 34 of the vessel portion 32 may have the function for guiding the float valve unit 50.

Figure 13:
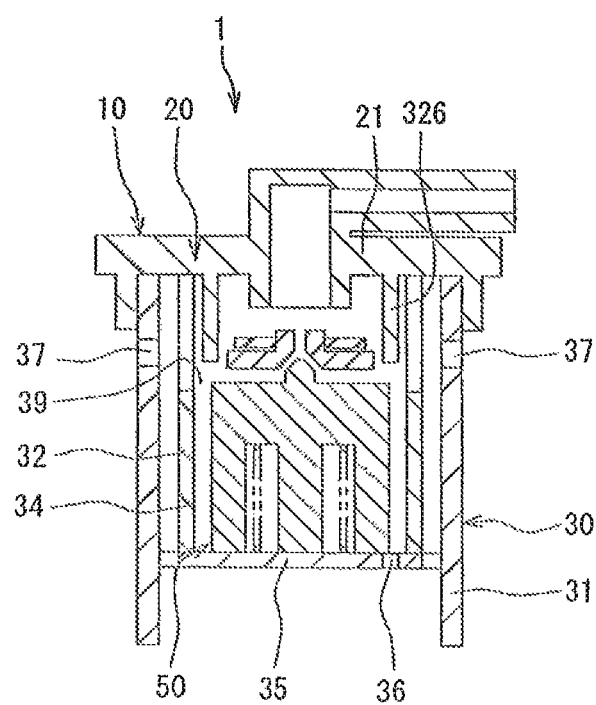

In a further modification of the modified embodiment of FIG. 11, for example, as shown in FIG. 13, the side wall portion 34 of the vessel portion 32 may be formed as a part of the upper casing part 20.

In the above first and second embodiments, the fuel drain through-hole 36 or 136 is formed at the closed end bottom 35 of the vessel portion 32. However, the present invention should not be limited to these embodiments. The fuel drain through-hole may be formed at any portion of the vessel portion, which is lower than the inlet port 39. For example, as shown in the third embodiment, the fuel drain through-hole may be formed at the side wall portion 34 of the vessel portion 32, which is close to the closed end bottom 35.

Figure 14:
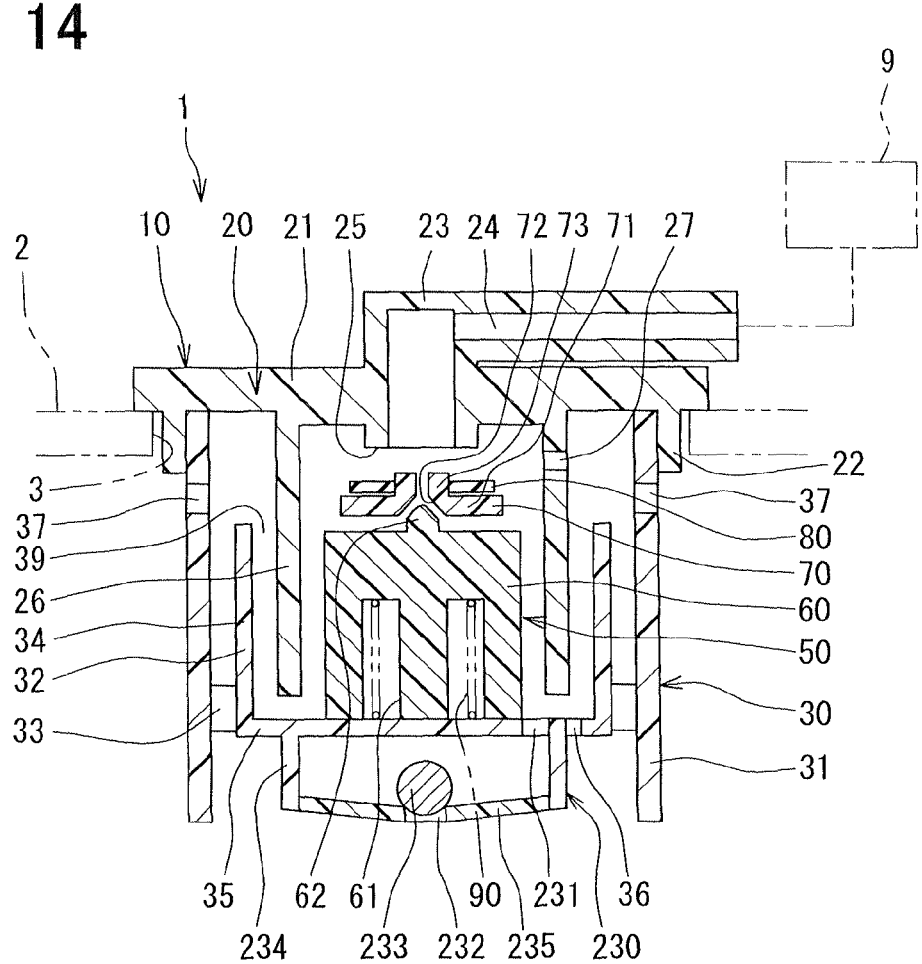

In the above third embodiment, the fuel drain through-hole 36 is formed at the side wall portion 34 of the vessel portion 32. However, the fuel drain through-hole may 36 may be formed at the closed end bottom 35 of the vessel portion 32, as shown in FIG. 14. According to the structure of FIG. 14, it is easier to manufacture the lower casing part 30.

In the above third embodiment, the valve unit for the fuel discharge aperture 232 is simply structured in the following manner. Namely, the upper side surface of the lower surface portion 235 for the fuel pooling portion 230 is formed as the tapered surface, so that the upper open end of the fuel discharge aperture 232 is positioned at the lowest position. In addition, the ball-shaped valve member 233 is arranged in the fuel pooling portion 230 to open and/or close the fuel discharge aperture 232.

However, the present invention should not be limited to the above structure. It may be modified in various ways so long as the fuel discharge aperture 232 is surely closed when the vehicle is stopped, and the fuel discharge aperture 232 is easily and surely opened when the vehicle starts the movement.

In addition, in the above third embodiment, the fuel pooling portion 230 is integrally formed with the vessel portion 32. The invention should not be limited to this structure. For example, the fuel pooling portion 230 may be formed as a separate portion from the vessel portion 32 and a communication pipe may be provided between them so that the inside spaces of the vessel portion and the fuel pooling portion are communicated with each other.

In the above embodiments, the fill-up control valve device 1 is explained as such a valve device for opening and/or closing the ventilation passage 24 for communicating the inside space of the fuel tank 2 with the canister 9, which is arranged at the outside of the fuel tank 2. The present invention may be applied to such a valve device, which is not connected to the canister, but which opens and/or closes a passage communicating the inside of the fuel tank with the outside thereof.

(Fourth Embodiment)

A fourth embodiment of the present invention will be explained with reference to FIGS. 16A and 16B.

Figure 16A:
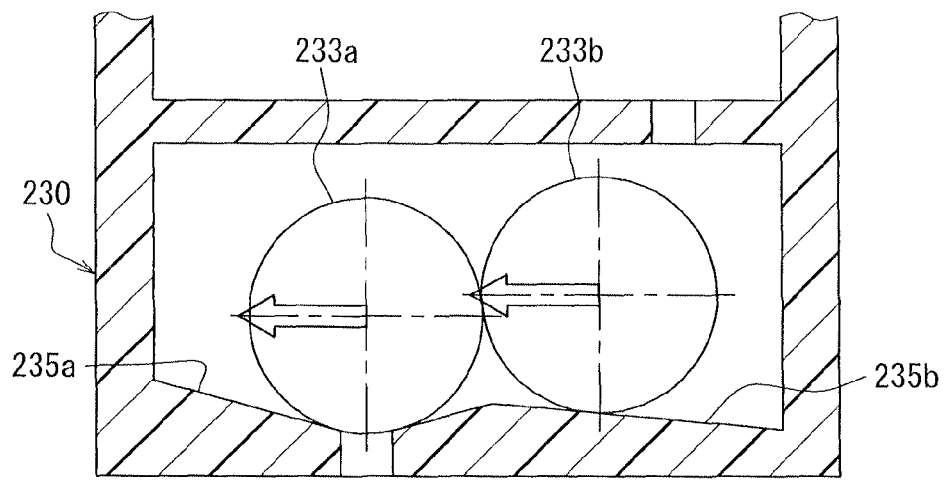
FIG. 16A is an enlarged cross sectional view schematically showing a relevant portion of a fuel pooling portion of a fill-up control valve device according to a fourth embodiment.

FIG. 16A is an enlarged cross sectional view schematically showing a relevant portion of the fuel pooling portion 230 of the fill-up control valve device according to the fourth embodiment. The fourth embodiment differs from the third embodiment (FIGS. 5 to 9) in that a size of the ball-shape valve member 233a is made smaller than that of the valve member 233 of the third embodiment and another ball-shape member (an assist ball member) 233b is provided, and so on.

Figure 16B:
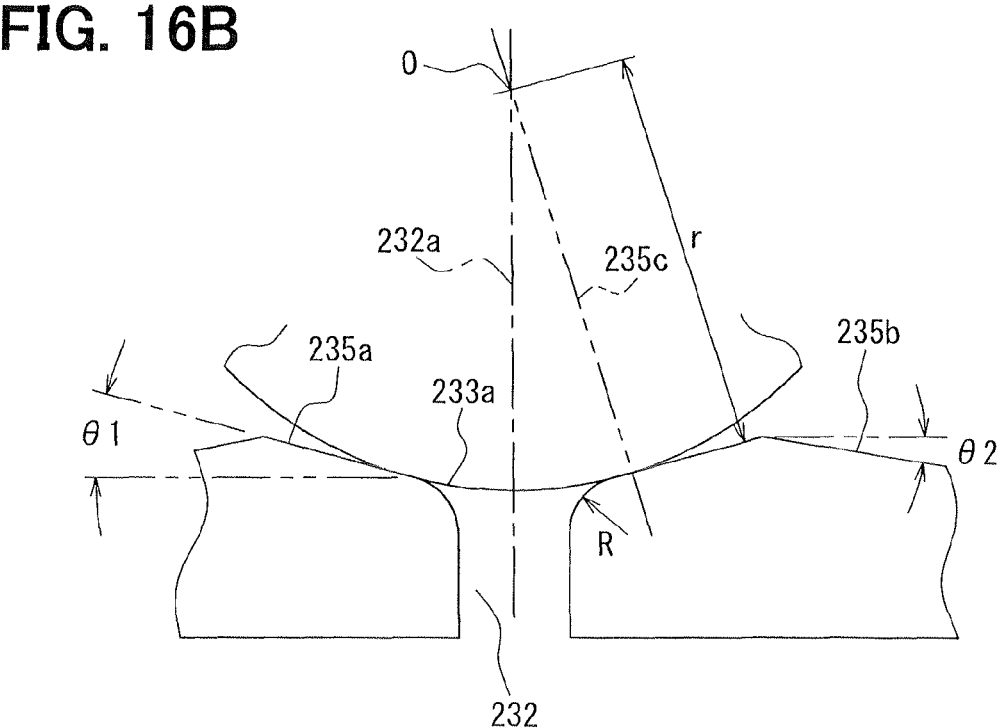
FIG. 16B is an enlarged cross sectional view schematically showing a relevant portion for a supplemental explanation of the fourth embodiment.

As shown in FIGS. 16A and 16B, an inside surface portion (which is a portion of the lower surface portion 235 of the fuel pooling portion 230) adjacent to the upper end of the fuel discharge aperture 232 is formed as a first tapered surface 235a, which has a first tapered angle θ1, for example, 10 degrees. The first tapered surface 235a is inclined toward the fuel discharge aperture 232, namely a surface position becomes higher as a distance from the fuel discharge aperture 232 becomes longer in a radial direction. Accordingly, any horizontal force is applied to the ball-shape valve member 233a, the ball-shape valve member 233a is seated on a valve seat, that is, the first tapered surface 235a.

An inside surface portion of the lower surface portion 235, which is formed at an outer area of the first tapered surface 235a, is formed as a second tapered surface 235b, which has a second tapered angle θ2, for example, a value between 0.5 to 1.0 degrees. The second tapered angle θ2 is smaller than the first tapered angle θ1.

The ball-shape member (the assist ball member) 233b is provided on the second tapered surface 235b. According to the present embodiment, the ball-shape member (the assist ball member) 233b is made of the same material to the ball-shape valve member 233a, wherein the size is the same to each other. When no horizontal force is applied to the ball-shape member 233b, the ball-shape member 233b is located at a position separated from the ball-shape valve member 233a (for example, at a right-most position in FIG. 16A).

When the vehicle starts movement and thereby horizontal force (acceleration in the horizontal direction) is applied to the ball-shape valve member 233a and the ball-shape member 233b, for example, as indicated by arrows in FIG. 16A in the leftward direction, the ball-shape valve member 233a is moved in the left-ward direction and separated from the valve seat by a sum of the acceleration applied to the ball-shape valve member 233a and a pushing force of the ball-shape member 233b (which is generated by the acceleration applied to the ball-shape member 233b), so that the fuel discharge aperture 232 is opened.

When the vehicle is stopped or when the vehicle is running at a constant speed, the horizontal force applied to the ball-shape valve member 233a and the ball-shape member 233b disappears. The, each of the ball-shape valve member 233a and the ball-shape member 233b is moved along the first and second tapered surfaces 235a and 235b to its initial position (namely, the fuel discharge aperture 232 is closed).

Generally, a size (a radius) of the ball-shape valve member 233a is decided in the following manner. A method for deciding the radius of the valve member 233a will be explained with reference to FIG. 16B.

As shown in FIG. 16B, a chamfered portion R is formed at the upper end of the fuel discharge aperture 232. The first tapered surface 235a continuously extends from the chamfered portion R. In other words, the first tapered surface 235a extends in a direction tangent to the chamfered portion R. An intersecting point O between a normal line 235c, which extends from a contact point between the chamfered portion R and the first tapered surface 235a in a direction perpendicular to the first tapered surface 235a, and a center line 232a of the fuel discharge aperture 232 is set as a central point of the ball-shape valve member 233a. Accordingly, the radius "r" of the ball-shape valve member 233a is defined as a distance between the central point O and the tapered surface 235a.

When the radius "r" of the ball-shape valve member 233a is made smaller in order to obtain a small-sized and light-weight valve member, the tapered angle "θ1" is increased. As a result, a force (a valve moving force) for moving the ball-shape valve member seating on the valve seat may become larger, so that the ball-shape valve member is separated from the valve seat.

According to the present embodiment, however, the ball-shape member (the assist ball member) 233b is provided in addition to the ball-shape valve member 233a, in order to solve the above problem. Therefore, even in the case that the valve moving force may be increased due to the small-sized ball-shape valve member, the ball-shape valve member 233a can be smoothly moved by the sum of the force applied to the ball-shape valve member 233a and the assisting force (the pushing force) of the assist ball member 233b, so that the fuel discharge aperture 232 can be smoothly opened.

What is claimed is:

1. A fill-up control valve device comprising:
   a casing attached to a fuel tank and having a ventilation passage communicating between an inside and an outside of the fuel tank, the casing including an inner wall and an outer wall both extending downward from the casing and a gap arranged between the inner and outer walls;

a float valve unit movably accommodated in a float guiding portion including the inner wall extending downward from the casing, the float valve unit being movable in a vertical direction in accordance with fuel liquid level in the casing and being brought into contact with an open end of the ventilation passage to operatively open and/or close the ventilation passage;

wherein, when the fuel liquid level in the fuel tank is raised to reach a first predetermined level, the fuel liquid level in the casing is raised to a second predetermined level which is higher than the first predetermined level, so that the float valve unit is moved up to close the ventilation passage;

wherein the casing has a ventilating aperture formed at a position higher than the second predetermined level, the ventilating aperture communicating between the inside of the fuel tank and the float guiding portion;

wherein the casing has a vessel portion with a closed end bottom, in which the float valve unit is arranged;

wherein the vessel portion further comprises:
  a side wall portion being arranged in the gap between the inner and outer walls extending from the casing, the side wall portion forming a liquid-fuel pooling space being configured to pool the liquid fuel and the float valve unit being arranged in the liquid-fuel pooling space;
  an inlet port formed at a portion higher than the closed end bottom and for introducing a part of the liquid fuel into an inside of the liquid-fuel pooling space of the vessel portion when the fuel liquid level reaches a third predetermined level higher than the second predetermined level; and
  a fuel drain through-hole formed at the vessel portion at a portion lower than the inlet port and for discharging the liquid fuel introduced into the inside of the vessel portion from the inlet port, and a cross sectional area of the fuel drain through-hole is smaller than an opening area of the inlet port.

2. The fill-up control valve device according to claim 1, wherein the fuel tank is mounted in a vehicle, and
  the casing further comprises:
    a fuel inlet aperture for communicating an inside of the liquid-fuel pooling portion with the inside of the vessel portion so that the liquid fuel may flow from the vessel portion into the liquid-fuel pooling portion;
    a fuel discharge aperture for discharging the liquid Mel pooled in the liquid-fuel pooling portion; and
    a valve member for closing the fuel discharge aperture when the vehicle is in its stopped condition and for opening the fuel discharge aperture when the vehicle starts its running operation,
  wherein the float valve unit opens the ventilation passage when a predetermined amount of the liquid fuel in the vessel portion flows into the liquid-fuel pooling portion.

3. The fill-up control valve device according to claim 2 wherein
  the fuel discharge aperture is formed at a lower surface portion of the liquid-fuel pooling portion,
  an upper surface of the lower surface portion is formed in a tapered surface, so that a surface portion away from the fuel discharge aperture becomes higher as a distance of the surface portion from the fuel discharge aperture becomes longer,
  the valve member has a specific gravity larger than that of the liquid fuel, and
  the valve member has a ball shape and the valve member is movable in the liquid-fuel pooling portion of the casing.

4. The fill-up control valve device according to claim 2, wherein the liquid-fuel pooling portion is defined by walls of the vessel portion at a lower side of the vessel portion.

5. The fill-up control valve device according to claim 2, wherein
  the fuel discharge aperture is formed at a lower surface portion of the liquid-fuel pooling portion,
  an upper surface of the lower surface portion, which is adjacent to an upper end of the fuel discharge aperture, is formed in a first tapered surface, so that the first tapered surface portion away from the fuel discharge aperture becomes higher as a distance of the first tapered surface from the fuel discharge aperture becomes longer,
  another upper surface of the lower surface portion, which is located at an outer area of the first tapered surface, is formed in a second tapered surface, so that the first tapered surface away from the fuel discharge aperture becomes lower as a distance of the first tapered surface from the fuel discharge aperture becomes longer,
  a tapered angle of the second tapered surface is made smaller than a tapered angle of the first tapered surface,
  the valve member is made of such material, a specific gravity of which is larger than that of the liquid fuel, and the valve member is formed in a ball shape so that the valve member is movable in the liquid-fuel pooling portion, and
  an assist ball member is movably arranged in the liquid-fuel pooling portion, such that when a horizontal acceleration is applied to the assist ball member, the assist ball member pushes the valve member in a direction of opening the fuel discharge aperture, to thereby assist a valve opening operation of the valve member.

6. The fill-up control valve device according to the claim 1, wherein the cross sectional area of the fuel drain through-hole is gradually reduced from an inner side toward an outer side of the vessel portion.

7. The fill-up control valve device according to the claim 6, wherein an inner peripheral surface of the fuel drain through-hole is formed in a tapered surface.

8. The fill-up control valve device according to the claim 1, wherein a fuel guiding portion is formed at the fuel drain through-hole so that the liquid fuel flows along the fuel guiding portion.

9. The fill-up control valve device according to the claim 8, wherein
  the fuel guiding portion is composed of an annular projecting portion downwardly projecting from an outer periphery of a lower end of the fuel drain through-hole, and
  a lower end surface of the annular projecting portion is inclined with respect to an axial line of the fuel drain through-hole.

10. The fill-up control valve device according to claim 1, wherein the vessel portion further comprises:
  a liquid-fuel pooling portion arranged at a lower side of the closed end bottom of the vessel portion and configured for pooling liquid fuel; and
  a single fuel inlet aperture arranged in the closed end bottom of the vessel portion and communicating between an outside and an inside of the liquid-fuel pooling portion for liquid fuel to flow from an inside of the vessel portion into the liquid-fuel pooling portion.

* * * * *